United States Patent
Sørensen et al.

(10) Patent No.: US 12,479,753 B2
(45) Date of Patent: Nov. 25, 2025

(54) ROTOR

(71) Applicant: ROCKWOOL A/S, Hedehusene (DK)

(72) Inventors: Jens Jørren Sørensen, Hedehusene (DK); Gorm Rosenberg, Hedehusene (DK)

(73) Assignee: ROCKWOOL A/S, Hedehusene (DK)

( * ) Notice: Subject to any disclaimer, the term of this patent is extended or adjusted under 35 U.S.C. 154(b) by 365 days.

(21) Appl. No.: 17/641,067

(22) PCT Filed: Sep. 9, 2020

(86) PCT No.: PCT/EP2020/075158
§ 371 (c)(1),
(2) Date: Mar. 7, 2022

(87) PCT Pub. No.: WO2021/048178
PCT Pub. Date: Mar. 18, 2021

(65) Prior Publication Data
US 2022/0340474 A1    Oct. 27, 2022

(30) Foreign Application Priority Data

Sep. 10, 2019    (EP) ..................................... 19196413

(51) Int. Cl.
*F16F 15/12*    (2006.01)
*C03B 37/05*    (2006.01)

(52) U.S. Cl.
CPC ............ *C03B 37/055* (2013.01); *F16F 15/12* (2013.01)

(58) Field of Classification Search
CPC ....... C03B 37/055; F16F 15/161; F16F 15/12; F16H 35/10; D01H 4/12; F16C 27/06;
(Continued)

(56) References Cited

U.S. PATENT DOCUMENTS 4,111,381 A * 9/1978 Kitamura ............... D01H 1/183
242/130.2
4,240,683 A * 12/1980 Crase ...................... F16C 19/54
384/615
(Continued)

FOREIGN PATENT DOCUMENTS

CN    1347839 A    5/2002
CN    101677202 A    3/2010
(Continued)

OTHER PUBLICATIONS

International Search Report and Written Opinion for PCT/EP2020/075158, mailed Nov. 16, 2020, ISA European Patent Office, 11 pages.
(Continued)

*Primary Examiner* — Alison L Hindenlang
*Assistant Examiner* — Steven S Lee
(74) *Attorney, Agent, or Firm* — Klarquist Sparkman, LLP

(57) ABSTRACT

A rotor for a fiberising apparatus includes a rotor housing; a first and second bearing assembly, wherein each bearing assembly has at least two ball bearings, each seated in a respective bearing seat; a substantially horizontal shaft rotatably mounted between the first bearing assembly and the second bearing assembly; and a plurality of resilient dampers arranged in an annular ring, wherein each resilient damper is releasably connected at a first end to the bearing seat and is releasably connected at a second end to the inner wall of the rotor housing.

30 Claims, 20 Drawing Sheets

(58) Field of Classification Search
CPC .......... F16C 25/08; F16C 33/32; F16C 19/54; D01D 5/18
See application file for complete search history.

(56) References Cited

U.S. PATENT DOCUMENTS

| | | | | |
|---|---|---|---|---|
| 4,657,413 | A | * | 4/1987 | Hasegawa ................ D01H 4/12 384/524 |
| 4,808,097 | A | * | 2/1989 | Takahashi ............ C03B 37/047 425/8 |
| 5,159,166 | A | * | 10/1992 | Arnosti .................. H05B 6/145 464/17 |
| 5,889,375 | A | * | 3/1999 | Del Rio ................ F16K 31/048 318/432 |
| 6,332,842 | B1 | * | 12/2001 | Tabuchi .................. F16H 55/36 403/41 |
| 2002/0052242 | A1 | | 5/2002 | Tabuchi .................. F16F 1/377 464/87 |
| 2003/0099417 | A1 | * | 5/2003 | Bauer .................. F16C 35/077 384/535 |
| 2007/0140610 | A1 | * | 6/2007 | Birkenmaier ............ D01H 4/12 384/536 |
| 2012/0181734 | A1 | * | 7/2012 | Zeidan .................... F16C 17/03 267/136 |
| 2016/0221862 | A1 | * | 8/2016 | Hansen .................. C09K 21/02 |
| 2017/0350452 | A1 | | 12/2017 | Shaikh et al. |
| 2019/0264757 | A1 | * | 8/2019 | Kurosu ............... F16F 15/1201 |

FOREIGN PATENT DOCUMENTS

| | | | | |
|---|---|---|---|---|
| CN | 101752949 | A | * | 6/2010 |
| CN | 103215677 | A | | 7/2013 |
| CN | 103350934 | A | | 10/2013 |
| CN | 107246469 | A | | 10/2017 |
| CN | 107428489 | A | | 12/2017 |
| CN | 107910979 | A | | 4/2018 |
| CN | 109338531 | A | | 2/2019 |
| CN | 110192055 | A | | 8/2019 |
| DE | 3527943 | C2 | * | 11/1994 ............... D01H 4/08 |
| DE | 19509384 | A1 | * | 9/1996 ............ F16F 15/126 |
| DE | 10024019 | A1 | * | 11/2001 ............ B65B 13/322 |
| DE | 10239941 | A1 | * | 4/2003 ............... F01D 5/10 |
| DE | 102004007758 | A1 | | 9/2005 |
| DE | 102009010126 | A1 | * | 9/2009 ........ F16F 15/12306 |
| DE | 202011110159 | U1 | | 2/2013 |
| DE | 202018103570 | U1 | | 8/2018 |
| EP | 0825965 | B1 | * | 7/1999 ............. C03B 37/05 |
| EP | 1413786 | A1 | * | 4/2004 ............. F16F 15/10 |
| EP | 2975006 | A1 | * | 1/2016 ........... C03B 37/055 |
| EP | 3392515 | A1 | | 10/2018 |
| FR | 2839319 | A1 | | 11/2003 |
| GB | 2489021 | A | | 9/2012 |
| JP | S49129043 | A | * | 12/1974 ............. F16C 27/06 |
| JP | S57-196823 | U | | 12/1982 |
| JP | S63-64922 | U | | 4/1988 |
| JP | H04-95120 | U | | 8/1992 |
| JP | H06-504256 | A | | 5/1994 |
| JP | 2001065595 | A | * | 3/2001 ............... F16D 9/06 |
| JP | 2007068653 | A | | 3/2007 |
| JP | 2008025766 | A | | 2/2008 |
| JP | 2014510885 | A | | 5/2014 |
| WO | WO-9015032 | A1 | * | 12/1990 ........... F16C 32/044 |
| WO | 9212939 | A1 | | 8/1992 |
| WO | 9212940 | A1 | | 8/1992 |
| WO | WO-0104399 | A1 | * | 1/2001 ............. D04B 15/48 |
| WO | WO-03095720 | A1 | * | 11/2003 ........... C03B 37/055 |
| WO | 2012123710 | A1 | | 9/2012 |
| WO | 2015055758 | A1 | | 4/2015 |

OTHER PUBLICATIONS

Office Action issued in related Chinese Application No. 202080077618.1 by the China National Intellectual Property Administration on Dec. 18, 2023, 9 pages (with English translation, 6 pages).

Notice of Reasons for Refusal issued by the Japan Patent Office in related Japanese Application No. 2024-158100, on Sep. 22, 2025, 13 pages.

* cited by examiner

ROTOR

CROSS REFERENCE TO RELATED APPLICATIONS

This is the U.S. National Stage of International Application No. PCT/EP2020/075158, filed Sep. 9, 2020, which was published in English under PCT Article 21 (2), which in turn claims the benefit of European Patent Application No. 19196413.9, filed Sep. 10, 2019. International Application No. PCT/EP2020/075158 and European Patent Application No. 19196413.9 are each incorporated herein by reference in their entirety.

FIELD

The present invention relates to an improved rotor and, in particular, relates to a rotor for a fiberising apparatus for use in the manufacture of man-made vitreous fibres (MMVF), and a method of manufacture of man-made vitreous fibres (MMVF).

SUMMARY

Spinning devices, known as fiberising apparatus or (cascade) spinners, are used for the manufacture of MMVF to produce insulation material; for example, to provide acoustic or heat insulating material from a mineral melt of stone or rock or a slag or glass melt. The fiberising apparatus have a set of rotors to spin the molten material or lava over a spinning wheel to produce a web-like insulation product. The molten stone or lava ("the melt") is thrown successively from a first rotor to the remaining rotors of the set and fibres are thrown off each wheel as each of the rotors rotate. The fibres are collected and carried away from the set of rotors for the manufacture of insulation products, such as stone wool insulation products.

The rotors within the spinners operate at very high speed. The control of the high speed and high acceleration force of the spinner controls the physical and performance characteristics of the fibres and so the insulation that is produced. It has been found that by increasing the speed and acceleration of the spinning device, the spun fibres can be made thinner and softer with improved and highly desirable heat insulation properties. It has been found that conduction in the spun fibre is less if the fibre is thinner and more air is held within an insulation product if it is made up of thinner fibres.

Known spinners operate at high speeds and accelerations of around 150 km/s$^2$ to achieve the required very thin fibres for good heat insulation properties. Each rotor wheel comprises a rotating shaft suspended between bearings at each of a drive end (DE) and a non-drive end (NDE). The NDE and DE of the rotor are not equidistant from the respective ends of the shaft because the shaft at the NDE passes beyond the rotor to the wheel onto which molten material is directed. The NDE of the shaft effectively overhangs the bearings and it has been found that the NDE of the rotor has the highest load. Vibration of the rotor mechanics at the DE and NDE during spinning causes significant wear on the bearings seated at each end of the rotor and wear on any dampers placed between the rotor housing and the spinner body. Known devices use dampers positioned between the rotor housing and the spinner body to reduce vibrations being passed from one rotor to other rotors in the set.

It is known to use springs as vibration absorbing means. U.S. Pat. No. 2,556,317 discloses a bearing assembly for a centrifuge with radial compression springs or rubber cushions arranged radially between the bearing element and the stationary frame of the machine. WO 2014/000799 discloses a spring damping element for an electric compressor/turbine generator. The damping element is a spring steel ring with recesses into which leaf springs are received to exert a radial force.

However, the scale and speeds of spinning of fiberising apparatus exert a very high load on the bearings used and so require worn bearings to be frequently replaced. Typically, a four-wheel spinner with which the rotor of the present invention is used produces 5-6 tonnes of stone wool per hour, such that any reduction in "down time" due to maintenance significantly increases the volume of product that can be produced.

The rotors in the fiberising spinners are each arranged about a substantially horizontal axis, such that there is a contribution to wear on the rotor bearings because gravity contributes to an unbalance, which leads to variable wear on the bearings. It has also been found that an unbalance in the forces exerted on each rotor is caused by the melt being thrown onto the rotor wheel. Any uneven wearing of the rotor mechanics or wearing of the external surface of the rotor assembly onto which the molten material is directed, exacerbates the unbalance. One example is the build-up of a layer of solidified melt on the rotor, so-called "freeze lining", which may be uneven and may detach in areas giving rise to unbalance. Due to a combination of these factors, the bearings used within existing spinners become worn much more quickly than desired, requiring the spinner to be out of production for maintenance. Thus, there is a significant need to improve the rotor configuration and dynamics to increase the mean time between failures.

The present invention sets out to provide an improved rotor for a fiberising apparatus, which addresses the above-described problems associated with unbalances and high rotating forces causing wear on the bearings of the rotors.

In a first aspect, the invention provides a rotor for a fiberising apparatus comprising a rotor housing; a first and second bearing assembly, wherein each bearing assembly comprises at least two ball bearings, each seated in a respective bearing seat; a substantially horizontal shaft rotatably mounted between the first bearing assembly and the second bearing assembly; and a plurality of resilient dampers arranged in an annular ring, wherein each resilient damper is releasably connected at a first end to the bearing seat and is releasably connected at a second end to the inner wall of the rotor housing.

It is understood that in the context of the present invention "rotor" is understood to refer to a rotating assembly; "shaft" is understood to refer to a long cylindrical rotating rod used to transfer rotating power; "damper" is understood to be a device to inhibit or absorb vibrations and the "inner wall" of the rotor housing is understood to be the wall facing towards the shaft of the rotor.

Preferably, each resilient damper is a frustum; more preferably, each resilient damper is frustoconical.

The present invention reduces wear on the bearings so that the rotor can withstand the high speeds and significant loads exerted by the spinner. The annular arrangement of a plurality of resilient dampers is particularly well-suited to the imbalances that occur in the high-speed spinners of the present invention. The present invention is a significant improvement over known solutions used in turbines. For example, resilient ring-shaped springs or dampers do not sufficiently protect the bearings to achieve the improved mean time between failure achieved by the present invention. The "soft" suspension of the present invention significantly increases the mean time between failure of the bearings/rotor and so improves the efficiency of a fiberising apparatus by reducing maintenance time. The releasable connection of the resilient damper to the bearing seat and to the inner wall of the rotor housing is such that dampers work both in compression and tension to offer a significant increase in the mean time before failure of the bearings. The present invention avoids any potential problems with the natural frequency of the dampers and avoids any loss of effect that can occur when using springs; for example, if a spring loses contact at one end.

It has been found that use of a plurality of frustoconical dampers can significantly reduce the load on the bearings even as rotor speed approaches supercritical speeds for the bearings. By way of example, testing at 13500 RPM with and without the soft suspension of the present invention, showed a reduction in dynamic load from 2760N to 192N.

A plurality of frustoconical dampers minimises the internal wear of the bearings by providing improved absorption of vibrations generated by the high speed/high acceleration and unbalances of the spinning rotor. Effectively, each damper is positioned and shaped to provide more resilient material where most required to withstand both the static and dynamic loads exerted on the bearing assembly. A frustum, conical or frustoconical damper has been proven to better withstand both static and dynamic loads at the bearing suspensions. When the shaft is rotating at high speed, any unbalance that occurs; for example, when the melt is poured in or fibres are thrown off, is absorbed by a resilient damper/s that expands or contracts according to the force exerted on the bearing assembly. The solution of the present invention is particularly suited to use with a fiberising apparatus and has been carefully configured to optimise the volume and stiffness of rubber that is arranged in the annular ring to extend the lifetime of the bearings. It has been found that the optimal choice is to maximise the volume of rubber within the constraints of the spinner, whilst making the suspension as "soft" as possible.

Optionally, each resilient damper is cylindrical. Alternatively, each resilient damper is a frustum of a pyramid; however, preferably each resilient damper is rotationally symmetrical.

Ease of mounting of the dampers at a bearing seat of a spinner is improved by the dampers having rotational symmetry; that is, by the damper being rotationally symmetrical about their central axis.

Preferably, the rotor comprises a plurality of frustoconical resilient dampers forming an annular ring between the bearing seat and the inner wall of the rotor housing.

Preferably, the rotor comprises a plurality of frustoconical resilient dampers wherein each damper has a greater diameter at the inner wall of the rotor housing and a lesser diameter at the bearing seat.

Preferably, each damper comprises a threaded screw for releasable connection to the bearing seat and/or each damper comprises a threaded aperture for releasable connection with a screw through the rotor housing.

Preferably, the rotor housing further comprises at least one threaded screw receivable by a threaded aperture in a damper.

The releasable connection of each damper allows for fast and convenient replacement to improve the efficiency of maintenance of the rotor.

Preferably, the rotor housing has a greater wall thickness at the base of the rotor housing than at the upper surface of the rotor housing.

Preferably, the rotor housing has an increased base wall thickness and decreased upper wall thickness in that the base wall thickness is increased between about 2 mm and about 3 mm and the upper wall thickness of the rotor housing is reduced correspondingly; more preferably, the rotor housing has a base wall thickness that is increased between about 2.2 mm and about 2.7 mm and the upper wall thickness of the rotor housing is reduced correspondingly; most preferably, the rotor housing has a base wall thickness that is increased by about 2.5 mm and an upper wall thickness of the rotor housing that is reduced by about 2.5 mm when compared with a standard wall thickness of the rotor housing.

Preferably, the bearing seat is substantially cylindrical, and the rotor housing is substantially cylindrical, wherein the central axis of the bearing seat is offset from the central axis of the rotor housing.

It is understood that "base wall thickness" refers to the thickness of the rotor housing wall in the area closest to the floor in use. The "upper wall thickness" refers to the thickness of the rotor housing wall at the area furthest from the floor in use.

Preferably, the internal profile of the rotor housing is asymmetric.

It has been found that a greater wall thickness at the base of the rotor housing effectively lifts the wheel to compensate for the overhanging effect, i.e. the effect of gravity on the overhanging wheel, and so reduces potential problems in the spinning process by adjusting the rotor to the desired position. For example, potential problems arise when various auxiliary installations are not aligned with the wheel, e.g. air nozzles or binder supply nozzles.

Preferably, the clearance between the annular bearing seat and the inner surface of the rotor housing is between about 10 mm and about 18 mm; more preferably, between about 12 mm and about 16 mm; most preferably, about 14 mm.

It has been found that by increasing the clearance between the annular bearing seat and the inner face of the rotor housing, the risk of failure due to debris/slag becoming lodged between the annular bearing seat and the inner surface of the rotor housing is significantly reduced. If debris/slag becomes lodged within the clearance, the suspension can no longer move, and the bearing is damaged. The arrangement of the present invention ensures that this cause of failure is eliminated.

Preferably, the height of each damper is between about 20 mm and about 30 mm; more preferably, the height of each damper is between about 22 mm and about 27 mm; most preferably, the height of each damper is about 25 mm.

Preferably, the outer face of each damper has a diameter of between about 18 mm and about 22 mm; more preferably, the outer face of each damper has a diameter of between about 19 mm and about 21 mm; most preferably, the outer face of each damper has a diameter of about 20 mm.

It is understood that the "outer" face of the damper refers to the face adjacent to the rotor housing.

Preferably, the inner face of each damper has a diameter of between about 25 mm and about 29 mm; more preferably, the inner face of each damper has a diameter of between about 26 mm and about 28 mm; most preferably, the inner face of each damper has a diameter of about 27 mm.

It is understood that the "inner" face of the damper refers to the face adjacent to the bearing seat Preferably, the total volume of each damper is between about 35,000 $mm^3$ and about 45,000 $mm^3$; more preferably, the total volume of each damper is between about 39,000 $mm^3$ and about 44,000 $mm^3$; most preferably, the total volume of each damper is about 43,000 $mm^3$.

Preferably, the or each damper is a rubber damper.

Optionally, the or each damper is a silicone damper.

Preferably, the or each damper is a neoprene rubber damper.

Preferably, the or each damper has a Shore A hardness of between 40 and 60; more preferably, the or each damper has a Shore A hardness of about 55.

Preferably, damper ring stiffness is between about 5·10$^5$ N/m and 10$^6$ N/m; more preferably, damper ring stiffness is less than or equal to 10$^6$ N/m.

"Damper ring stiffness" is understood to be the total stiffness of the total number of dampers arranged annularly.

It has been found that if the damper ring stiffness is too low, this will cause the wheel to hang to a greater extent than is desirable, whilst if the damper ring stiffness is too high, the lifetime of the bearings will be reduced. Furthermore, if the damper ring stiffness is too low this can cause damage because the rotor moves more than is desirable and there is significant movement in relation to the coupling to a motor or contact between parts. By optimising the damper ring stiffness, the vibration and unbalances in the rotor can be accurately compensated for to reduce the wear on the bearings and increase the lifetime of the rotor/s. Rigorous testing has shown that a greater volume of softer rubber performs more effectively than a lesser volume of stiffer rubber. The damper ring stiffness of the present invention have been optimised to a working rotation speed of between about 4000 RPM and 13000 RPM. It is understood that the bearing lifetime is how long a user can expect the ball bearing to last under standard operating conditions, which has been found to depend on the amount of bearing load and is calculated in number of revolutions so that the time per revolution and the percentage of time the bearing is in continuous revolution are used to determine bearing life.

Preferably, the first bearing assembly is at a non-drive end of the rotor and comprises between 10 and 24 dampers; more preferably, the first bearing assembly is at a non-drive end of the rotor and comprises 20 dampers. Preferably, the second bearing assembly is at a drive end of the rotor and comprises between 10 and 24 dampers; more preferably, the second bearing assembly is at a drive end of the rotor and comprises 18 dampers.

The volume of rubber in the "soft" suspension of the present invention and the number of dampers has been carefully selected to withstand wear. For all rotor sizes, an optimum number of rubber dampers is used to provide the required lifetime whilst ensuring that unbalances are compensated for.

Preferably, the rotor comprises between about 10 and about 24 frustoconical dampers arranged annularly. More preferably, the rotor comprises between about 10 and about 24 frustoconical dampers arranged annularly equidistant from each other around a substantially annular bearing assembly.

Preferably, the or each bearing is a ball bearing; more preferably, an angular contact ball bearing.

Preferably, the or each bearing is a hybrid angular ball bearing having a steel lining and balls made of ceramic material.

Preferably, the inner diameter of the or each ball bearing is between about 40 mm and about 80 mm; more preferably, the diameter of the or each ball bearing is between about 60 mm and about 70 mm; most preferably, the diameter of the or each ball bearing is about 70 mm.

A small diameter increases lifetime of the bearing, but too small diameter is problematic in view of fitting the wheel onto the shaft (contact faces on shaft will be become too small).

Preferably, the bearing assembly comprises two angular contact ball bearings provided spaced apart.

Preferably, the distance between the two angular contact bearings is between about 10 mm to about 30 mm; more preferably, the distance between the two angular contact bearings is between about 15 mm to about 25 mm; most preferably, the distance between the two angular contact bearings is about 20 mm.

Preferably, the contact angle of each angular contact ball bearing is about 15°.

Preferably, the bearing assembly comprises two angular ball bearings each spaced apart by an inner axial spacer ring and an outer axial spacer ring.

It has been found that there is a significant temperature difference between the shaft of the rotor and the bearing seat when the rotor is in use. When the shaft is cold it will have a lesser diameter and a greater pressure angle with respect to the pressure direction on the bearing. When the shaft is hot it will expand to a greater diameter and the pressure angle on the bearing will reduce. The configuration of the bearing assembly to comprise an inner axial spacer ring and an outer axial spacer ring allows for the expected temperature difference so that the ball bearings do not "rattle" or have too much pressure exerted on them but are in the desired position.

Preferably, the width of the outer spacer ring is less than the width of the inner spacer ring.

Preferably, the width of the outer spacer ring is between about 10 µm and about 70 µm less than the width of the inner spacer ring; more preferably, the width of the outer spacer ring is about 61 µm less than the width of the inner spacer ring.

Preferably, the or each spacer ring is steel.

Preferably, the shaft is substantially cylindrical.

Preferably, the outer cross-sectional diameter of the shaft is between about 80 mm and about 120 mm; more preferably, about 100 mm.

The diameter of the shaft of the present invention is a compromise because increasing diameter will make the shaft stiffer, thereby positively influencing the dynamic behaviour of the system, but negatively influencing the weight and cost. If the diameter is chosen at 30 mm for the present system, the flexibility of the shaft will mean that the shaft rotates at critical speed at 12,000 RPM and bend critically.

Preferably, the relationship between the shaft diameter ($D_{shaft}$) and the shaft length ($L_{shaft}$) is defined as: $D_{shaft}(L_{shaft}) \geq 0.12 * L_{shaft} - 32$ mm for a range of shaft lengths between about 101 mm and about 1325 mm and for a range of shaft diameters greater than or equal to 20 mm and for a seat stiffness (damper ring stiffness) of less than or equal to $3*10^6$ N/m.

By increasing the cross-sectional diameter, also referred to as "thickness" of the shaft the vibrations generated by the shaft when rotating are significantly reduced. By reducing vibration, the wear on moving parts and unbalance of the device is reduced, such that the mean time between failure is increased.

Preferably, the length of the shaft between a centre-point of the first bearing assembly and a centre-point of the second bearing assembly is between about 530 mm and about 590 mm; more preferably, about 590 mm.

Preferably, the total length of the shaft is between about 800 mm and about 1200 mm; preferably about 1000 mm.

Preferably, the shaft is steel.

Preferably, the weight of the or each bearing seat is between about 1.5 kg and about 3.5 kg; preferably, between about 2 kg and about 3 kg; more preferably, the weight of each bearing seat is about 3 kg.

It has been found that reducing the mass of the bearing seat reduces the vibrations and so the wear on the bearings such that the lifetime and mean time between failure of the bearings is increased.

Preferably, the bearing seat is an annular ring having a plurality of substantially cylindrical recesses each for receiving a damper, preferably a frustoconical damper. Optionally, the bearing seat is an annular ring having a plurality of truncated cylindrical recesses each for receiving a damper, preferably, a frustoconical damper.

By minimising the weight of the bearing seat, the load on the bearings is reduced. The shape and configuration of the bearing seat securely holds the dampers, whilst allowing for easy removal of the dampers for maintenance and to access the ball bearings.

Preferably, the maximum rotational speed of the rotor is about 13,000 RPM.

Preferably, the rotational speed of the rotor is between about 6,000 RPM and about 13,000 RPM.

Preferably, the rotor further comprises a cooling system.

Preferably, the cooling system comprises at least one fluid inlet and at least one fluid outlet with at least one channel therebetween passing through at least one bearing seat of the rotor.

The cooling system of the present invention allows the temperature change (ΔT) between bearing seats to be substantially constant. Thus, the temperature of the ball bearings can be reduced. The cooling system also ensures that the temperature of the rubber damper/s is kept low, so that the maximum temperature is maintained at about 50-60° C.

Preferably, the rotor is water-cooled.

Preferably, the rotor further comprises an air-flow system.

Preferably, the rotor further comprises an airflow purging system.

The present invention operates within a harsh environment and the bearings are relatively exposed because of the open housing design. It has been found that air flow through the system can be used to remove unwanted debris and contaminants from around the or each bearing to reduce uneven wearing of the bearings and optimise performance of the rotor.

Preferably, each rotor is provided with a drive means.

Preferably, the rotor housing is substantially cylindrical.

More preferably, the rotor housing is substantially cylindrical comprising two mating parts. Preferably the two mating parts are substantially symmetrical. More preferably, the rotor housing comprises two semi-cylindrical shells. Preferably, the two semi-cylindrical shells mate with each other to form the substantially cylindrical housing. Preferably, each shell has the shape of a longitudinal half of a cylinder.

By providing an open housing, which can be easily and conveniently opened, the time and complexity of maintenance is reduced so that the "down time" when the device is not operational for maintenance reasons is also reduced.

In a further aspect, the invention provides a fiberising apparatus comprising a set of at least three rotors as described herein, each rotor mounted for rotation about a different substantially horizontal axis and arranged such that, when the rotors are rotating, melt poured on to the periphery of the first rotor in the set is thrown successively onto the periphery of each of the subsequent rotors and fibres are thrown off from the rotors.

Preferably, the fiberizing apparatus comprises a set of four rotors as described herein.

Preferably, each subsequent rotor is sized such that it can give greater acceleration than the preceding rotor in the set.

Preferably, each rotor is attached to a wheel.

Preferably, a first rotor is attached to a first wheel having a diameter of about 184 mm, wherein the first wheel is rotatable at between about 5,000 RPM and about 6,000 RPM with an acceleration field of between about 25 km/s$^2$ and about 36 km/s$^2$.

Preferably, a second rotor is attached to a second wheel having a diameter of about 234 mm, wherein the second wheel is rotatable at between about 6,000 RPM and about 13,000 RPM with an acceleration field of between about 46 km/s$^2$ and about 217 km/s$^2$.

Preferably, a third rotor is attached to a third wheel having a diameter of about 314 mm, wherein the third wheel is rotatable at between about 6,000 RPM and about 13,000 RPM with an acceleration field of between about 62 km/s$^2$ and about 291 km/s$^2$.

Preferably, a fourth rotor is attached to a fourth wheel having a diameter of about 332 mm, wherein the fourth wheel is rotatable at between about 6,000 RPM and about 13,000 RPM with an acceleration field of between about 65 km/s$^2$ and about 308 km/s$^2$.

Preferably, the fiberising apparatus further comprises a collector; more preferably, comprising a chamber to collect the fibres from the or each rotor and carry them away from the set of rotors.

Preferably, the fiberising apparatus further comprises at least one temperature sensor; optionally, comprising a pyrometer.

In a further aspect, the present invention provides a method of manufacture of man-made vitreous fibres (MMVF) comprising:
  providing a fiberising apparatus comprising a set of at least three rotors as described herein, each mounted for rotation about a different substantially horizontal axis, wherein each rotor has a drive means;
  rotating the rotors;
  providing a mineral melt for formation of man-made vitreous fibres (MMVF) wherein the melt is poured on to the periphery of the first rotor; collecting the fibres formed.

For the purposes of clarity and a concise description, features are described herein as part of the same or separate embodiments; however, it will be appreciated that the scope of the invention may include embodiments having combinations of all or some of the features described.

BRIEF DESCRIPTION OF THE DRAWINGS

The invention will now be described by way of example with reference to the accompanying drawings, in which:—

FIG. 4b is a perspective view of a section of the bearing seat shown in FIG. 4a;

FIG. 5b is a perspective view of a cross-section of the frustoconical damper of FIG. 5a;

FIG. 6b is a perspective view of a section of the bearing seat shown in FIG. 6a;

FIGS. 9a, 9b and 9c are schematic cross-sectional views (not to scale) through a pair of angular contact ball bearings in the rotor of the present invention, exemplifying the preferred reduction in bearing preloads due to temperature differences, wherein FIG. 9b shows the shaft when cold and FIG. 9c shows the shaft when hot;

DETAILED DESCRIPTION

Figure 1:
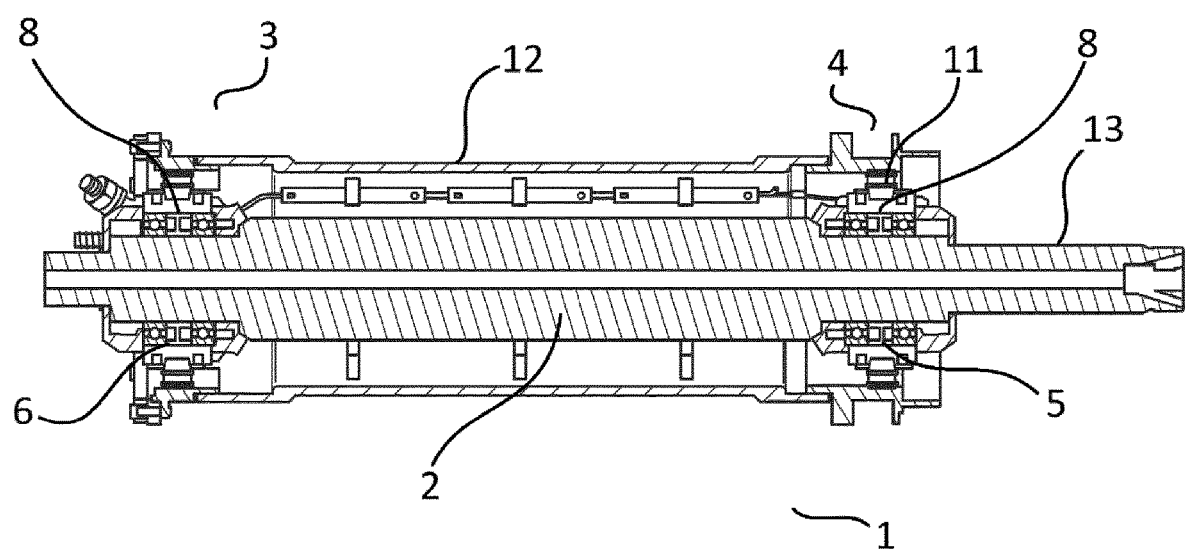
FIG. 1 is a longitudinal cross-sectional view of a rotor according to the present invention.

Referring to FIG. 1, a longitudinal cross-section of the rotor 1 is shown, with the shaft 2 longitudinally positioned between a drive end (DE) 3 and non-drive end (NDE) 4 of the rotor 1 to be substantially horizontal. The shaft 2 is a hollow cylindrical steel shaft with an outer diameter of about 100 mm and a bearing seat diameter of about 70 mm. In alternative embodiments, the shaft outer diameter is between about 100 mm and about 120 mm and the bearing seat diameter is between about 50 mm and about 100 mm. The length of the shaft 2 between a centre-point of the bearing at the DE 3 and a centre-point of the bearing at the NDE 4 is between about 530 mm and about 590 mm. For the embodiment shown, the length of the shaft 2 is about 590 mm. At the NDE 4 the shaft 2 "over-hangs" beyond the first bearing assembly 5 and the total length of the shaft 2 is about 955 mm. A second bearing assembly 6 is positioned at the DE 3.

Figure 3:
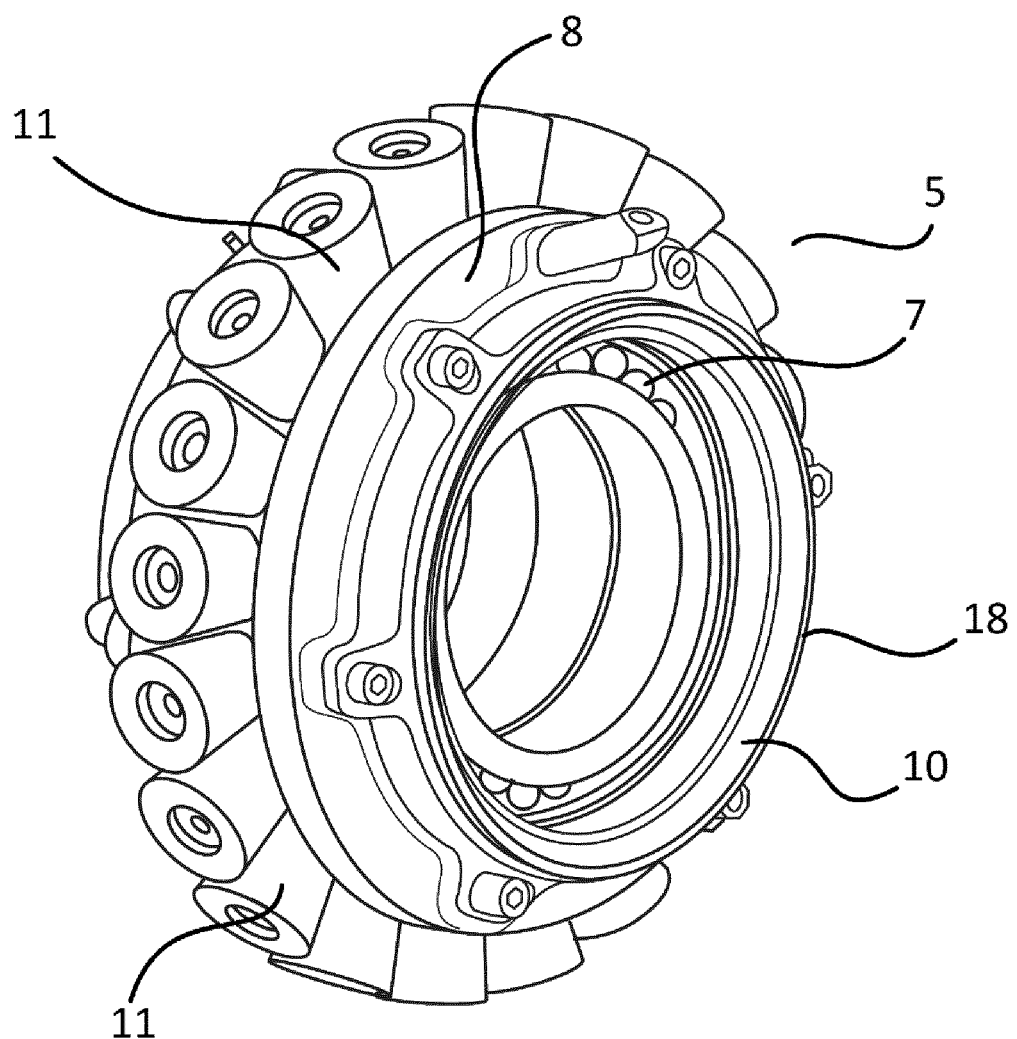
FIG. 3 is a perspective view of a bearing assembly at the non-drive end (NDE) of the rotor of FIG. 1.

The bearing assembly 5, 6 for both the NDE 4 and the DE 3 are identical (except for minor details like cooling water supply to the wheel), but the NDE 4 bearing assembly 5 is described in more detail with respect to FIGS. 3 to 5. The first and second bearing assembly 5, 6 are each placed adjacent to a "soft" suspension, with the respective first and second soft suspensions acting independently of each other. The NDE 4 may comprise more than one bearing assembly 5, which will increase bearing lifetime as the static load on each bearing assembly 5 is reduced.

Figure 2:
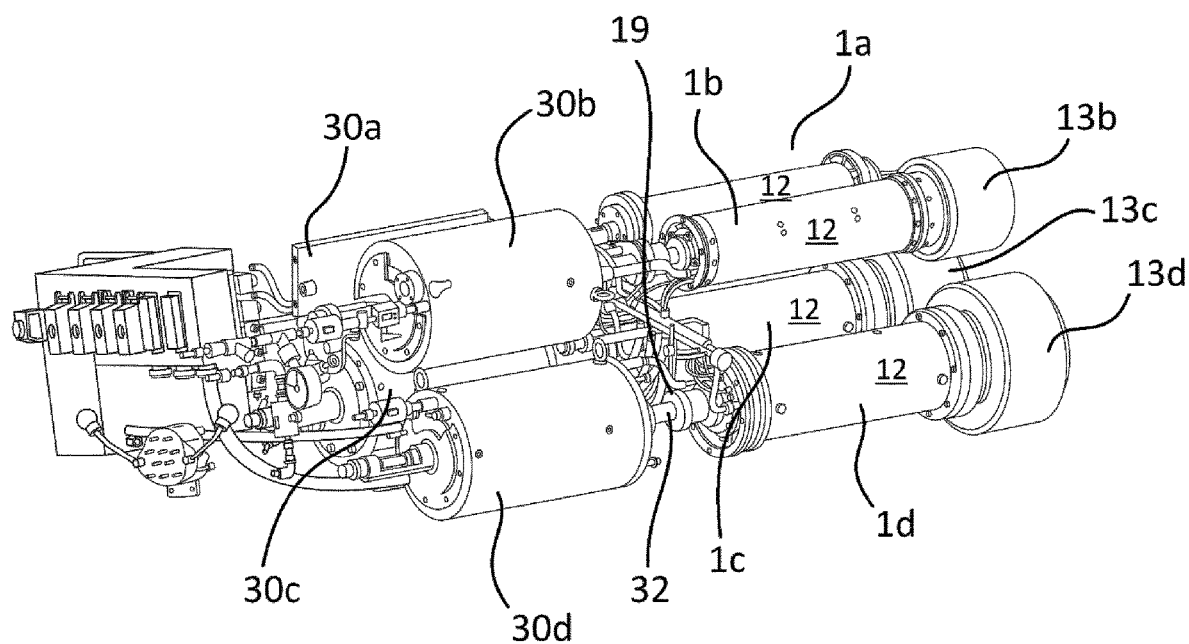
FIG. 2 is a perspective view of a right position spinner comprising four rotors in accordance with the present invention, shown without the spinner housing.
Figure 8A:
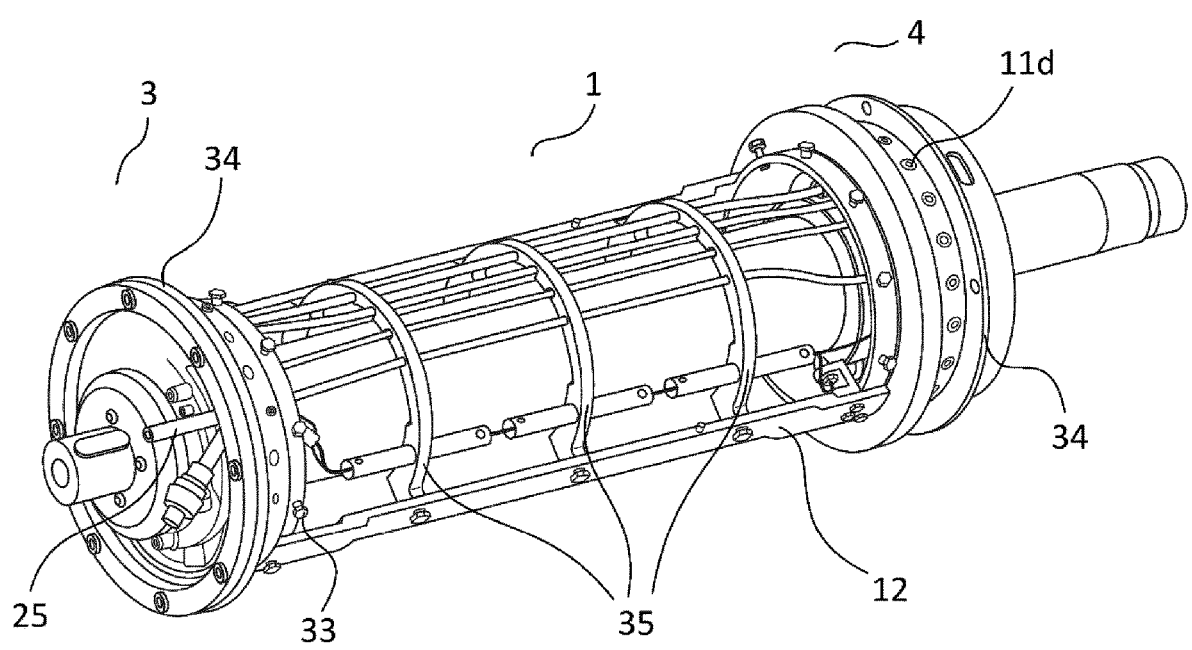
FIG. 8a is a perspective view of the rotor of the present invention showing half of the rotor housing removed.

Referring to FIG. 2, a perspective view of the four rotors of a right position spinner is shown without the spinner body; a first rotor 1a, a second rotor 1b, a third rotor is and a fourth rotor 1d, are shown. Right position refers to the position of fourth rotor 1d to the right. A variant (not shown) is a left position spinner, which is a mirror image of the right position spinner shown in FIG. 2, but with the fourth rotor 1d positioned to the left. The first rotor 1a has a maximum speed of 6000 RPM and is connected to a first motor 30a. The second rotor 1b has a maximum speed range of between 6000-13000 RPM and is connected to a second motor 30b. The third rotor is has a maximum speed range of between 6000-13000 RPM and is connected to a third motor 30c. The fourth rotor 1d has a maximum speed range of between 6000-13000 RPM and is connected to a fourth motor 30d. The wheels 13b, 13c, 13d attached respectively to the second, third and fourth rotors are shown. Each motor 30a, 30b, 30c, 30d and the respective motor shaft are fixed at the spinner body. The rotor shaft 2, shown in FIG. 1, is mounted flexibly inside the rotor housing 12, which is also fixed. A flexible lamella coupling 32 connects the shafts of each motor drive end and drive end of each rotor and allows for some radial misalignment. However, the maximal allowable radial misalignment of the present coupling is 1.3 mm. Hence the coupling puts a restriction on the allowable displacement of the shaft 2 at the DE 3. With reference to FIG. 8a, there are further connections between the motors 30a, 30b, 30c, 30d and the rotors 1, 1b, 1c, 1d to power and cool the spinner.

Figure 4A:
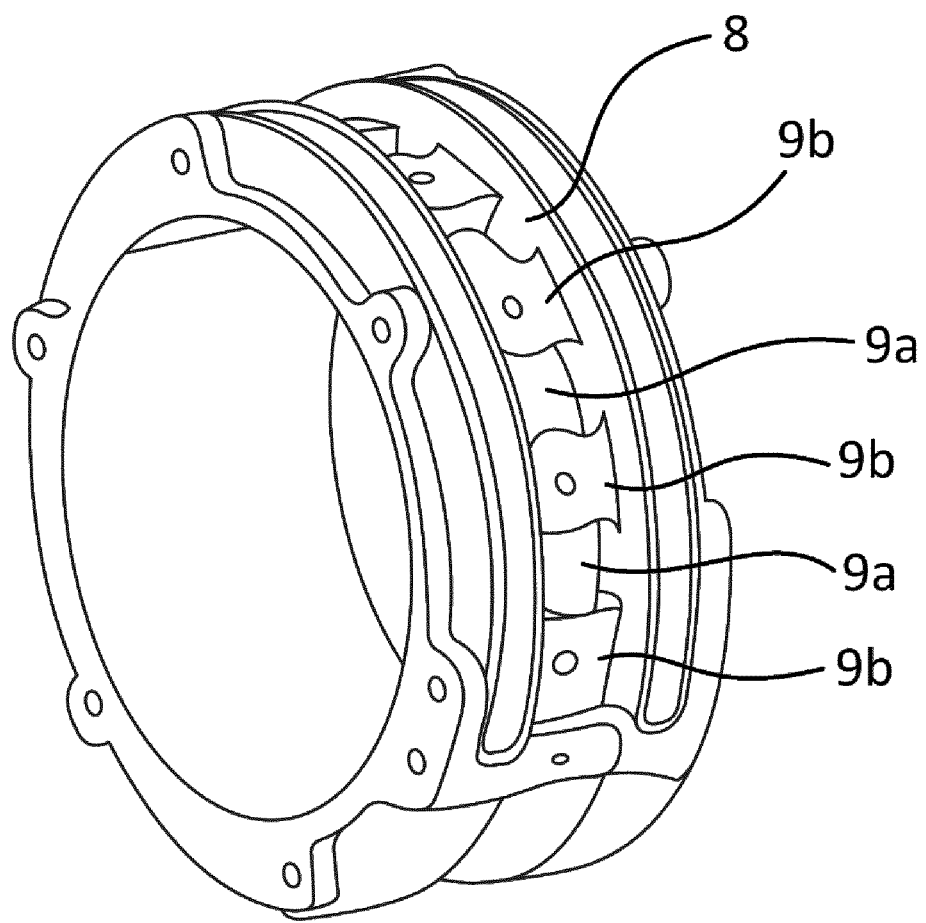
FIG. 4a is a perspective view of the bearing seat of the bearing assembly of the rotor in accordance with the present invention without the dampers shown.
Figure 4B:
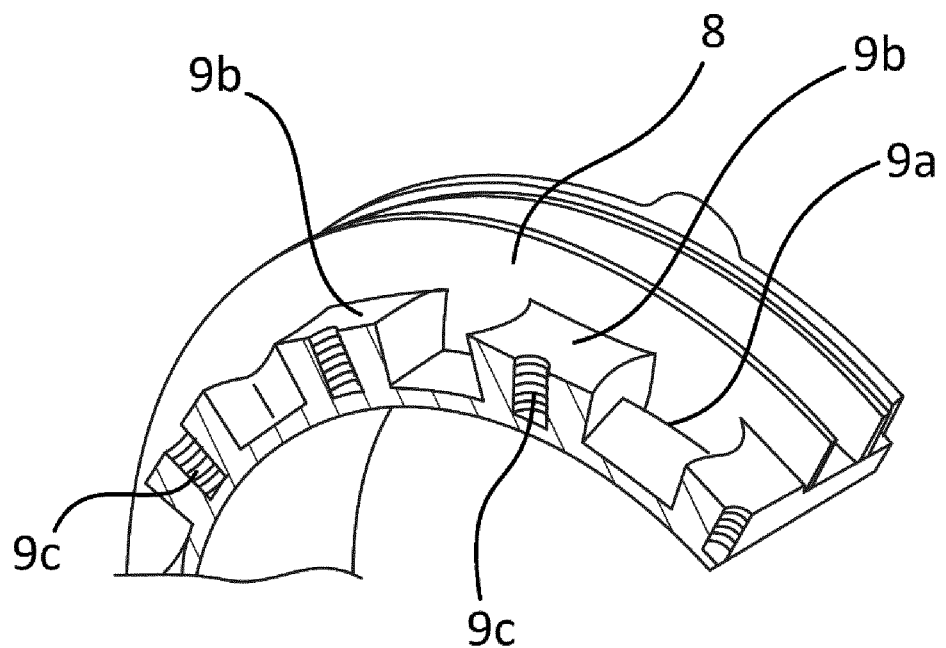

With reference to FIGS. 3, 4a and 4b the bearing assembly 5 is shown in more detail and comprises two ball bearings 7 held within an annular bearing seat 8. The bearing seat 8 has a stainless-steel body shown in FIG. 4a and FIG. 4b having a plurality of recesses 9a equally spaced around its outer surface with damper seats 9b equally spaced therebetween. Referring to FIG. 4b, each damper seat 9b has a threaded hole 9c into which a damper 11 is secured. As shown in FIG. 4b, the recesses 9a are truncated cylindrical recesses. The bearing seat 8 has a very low mass of 3 kg with the minimum of material to support the components held by the bearing seat 8. The bearing seat 8 also comprises an aluminium labyrinth ring 10 to reduce the seat mass.

Figure 5A:
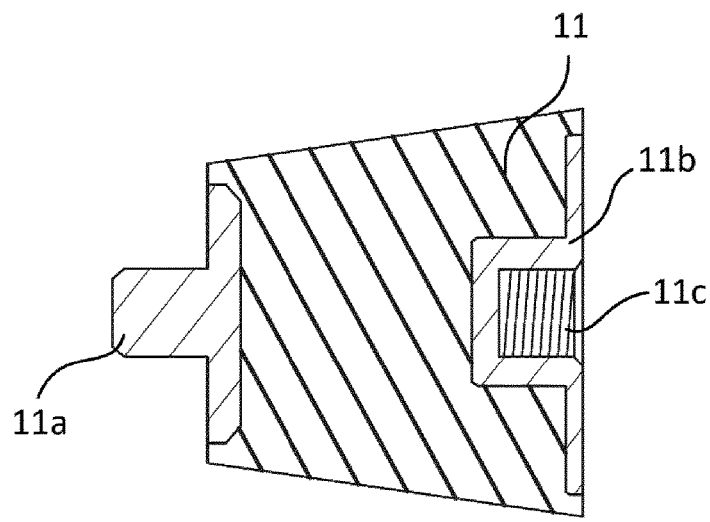
FIG. 5a is a cross-sectional view through a frustoconical damper shown in the bearing assembly of FIG. 3.
Figure 5B:
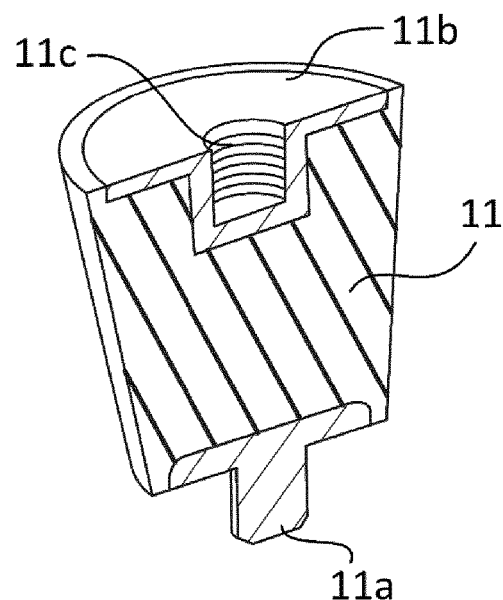
Figure 5C:
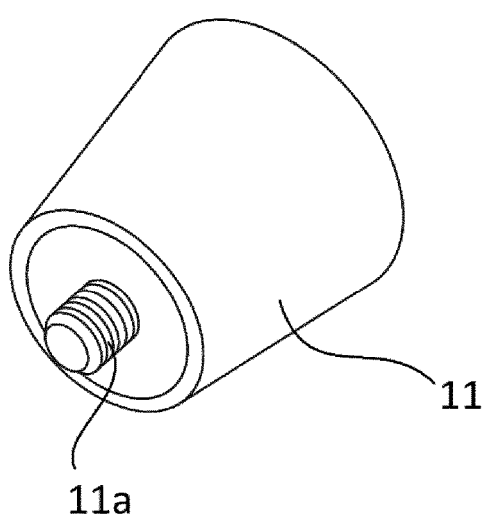
FIG. 5c is a perspective view of the damper of FIGS. 5a and 5b.

With reference to FIG. 3 and FIG. 4a, each damper seat 9b supports one end of a frustoconical damper 11, which protrudes from the bearing seat 9b and the bearing seat 8. As shown in FIGS. 5a, 5b and 5c, the dampers 11 are frustoconical with a threaded metal screw 11a at a first smaller inner end face or tap end. The inner end face has a diameter of about 20 mm. There is a further metal insert 11b at the second outer end face or hole end, which has a central threaded aperture 11c partially into the rubber damper 11. The outer end face has a diameter of about 27 mm and the length of the damper 11 is about 25 mm. With reference to FIGS. 3 and 4b, the damper 11 is connected to the bearing seat 8 by a screw connection, whereby the threaded screw 11a of the damper 11 engages a threaded hole 9c in the bearing seat 8. Similarly, the outer end face of the damper 11 is provided with the threaded aperture 11c for engagement with a threaded screw or bolt for connecting the damper 11 to the rotor housing (not shown). The dampers 11 are made of neoprene rubber with a Shore A hardness of about 55 and a damper ring stiffness of about $10^6$ N/m. It is understood that, although the embodiment shown is for a bearing assembly/suspension at the NDE 4, the damper ring stiffness of about $10^6$ N/m is substantially similar at the DE 3. In alternative embodiments, the dampers are cylindrical, but in the preferred embodiment shown in FIG. 3, for rotor 4, there are twenty frustoconical dampers 11 spaced equidistant from each other around the bearing seat 8. Each damper 11 does not touch the adjacent damper 11 in the annular arrangement. The embodiment shown in FIG. 3 is for the fourth rotor of a fiberising apparatus having four rotors. In alternative embodiments, as shown in FIG. 6a, the rotor has between about twelve and about twenty-two frustoconical dampers 11' equidistant from each other.

Figure 6A:
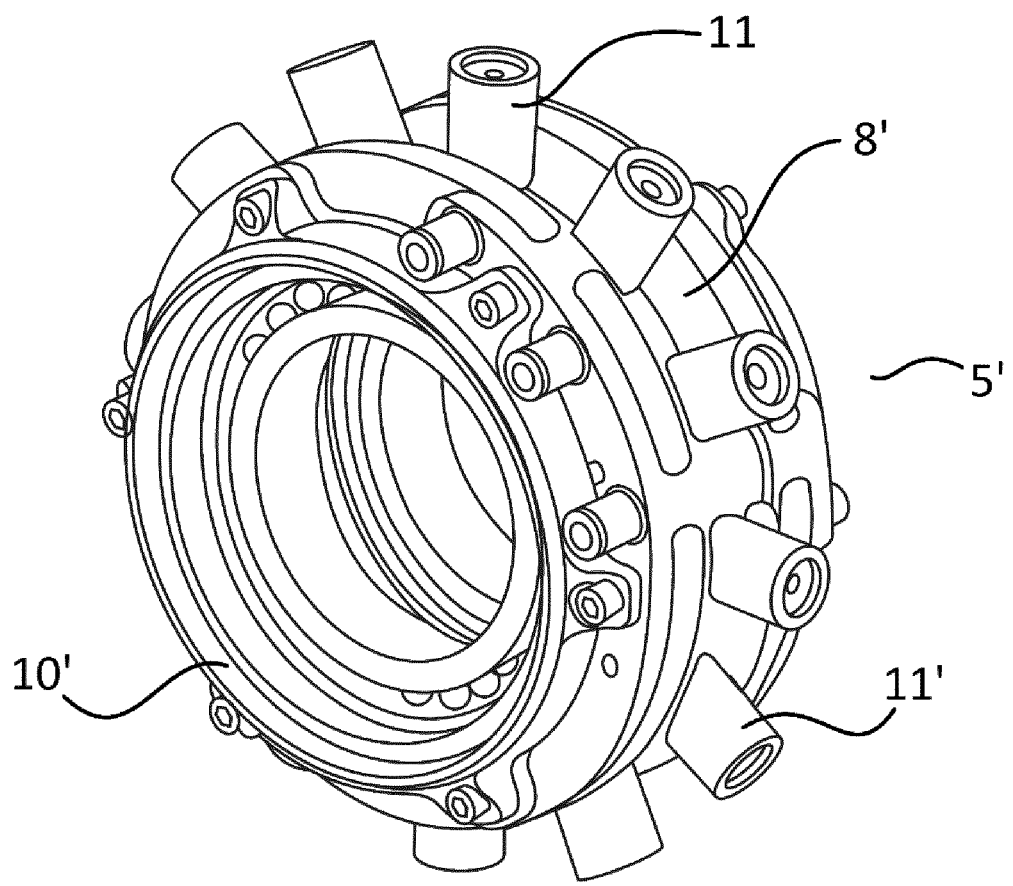
FIG. 6a is a perspective view of an alternative embodiment of a bearing assembly at the non-drive end (NDE) of a rotor in accordance with the present invention.
Figure 6B:
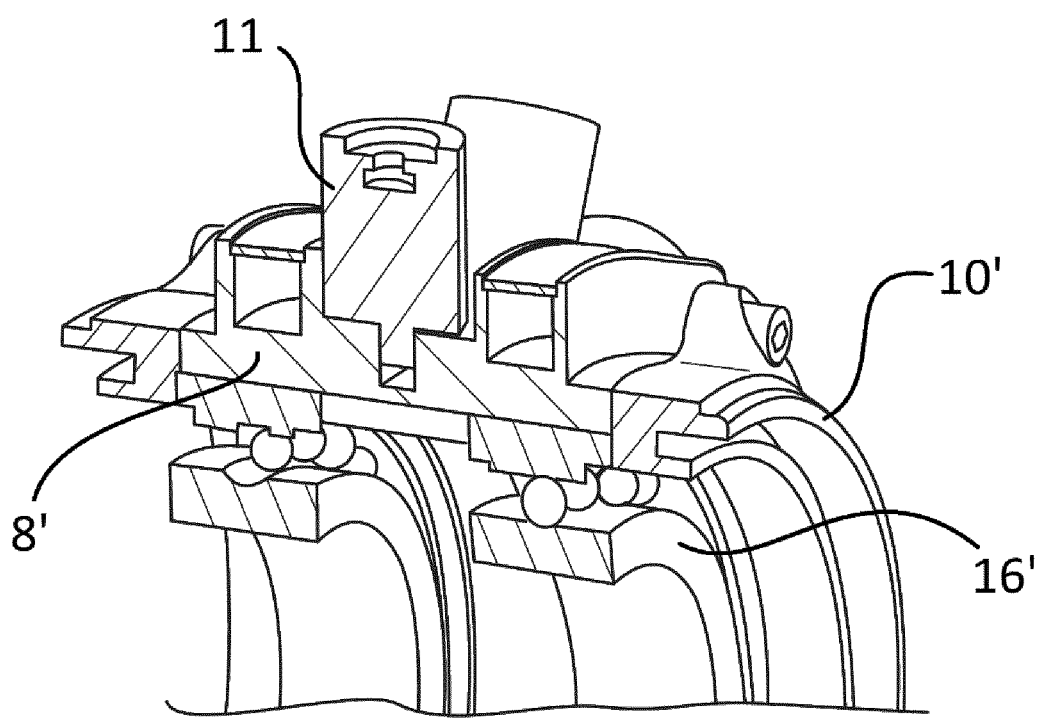

FIG. 6a and FIG. 6b show an alternative embodiment of the first bearing assembly 5' and a bearing seat 8' for the third and fourth rotors having twelve substantially cylindrical dampers 11 spaced equidistant from each other around the bearing seat 8', with each damper 11 having a Shore A hardness of about 55 and damper ring stiffness of about $10^6$ N/m. The damper 11 is connected to the bearing seat 8' by a screw connection, in that a threaded screw of the damper 11 is engaging a threaded hole in the bearing seat 8'. Similarly, the other end of the damper 11 is provided with a threaded aperture for engagement with a bolt for connecting the damper 11 to the rotor housing. The bearing seat 8' further comprises a ball bearing inner steel ring 16' and aluminium labyrinth ring 10', which is used to reduce the seat mass.

Figure 7:
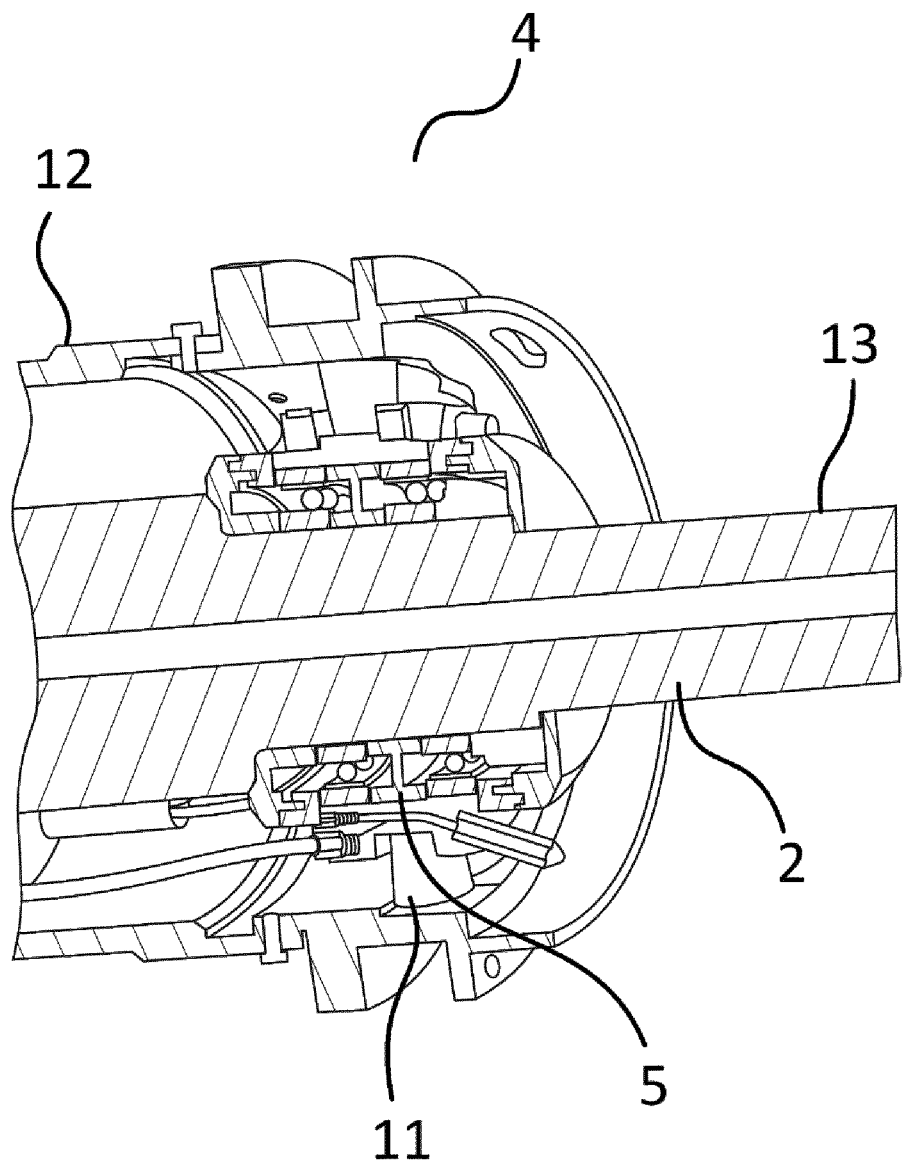
FIG. 7 is a cross-sectional view through a bearing assembly at the non-drive end (NDE) of the rotor showing the greater clearance between the bearing assembly and the rotor housing.

Referring to FIGS. 1, 2 and 7, the dampers 11 are positioned between the bearing seat 8 and the rotor housing 12 to form an annular bearing ring. As shown in FIG. 7, the rotor housing 12 of the present invention has a clearance of about 14 mm between the bearing assembly 5 and the inner surface of the housing 12, both at the NDE 4 and the DE (not shown) In use, the rotor 1 would be attached to a high strength steel wheel at a position 13 further along the shaft 2 from the first bearing assembly 5 at the NDE 4. Referring to FIG. 2, the wheel 13a, 13b, 13c, 13d is placed at a first end of the shaft 2 and the opposite end is connected to a high-speed motor 30a, 30b, 30c, 30d by a flexible coupling. There is a relatively narrow space between the wheels 13a, 13b, 13c, 13d. For the fourth rotor example shown in FIG. 1, the wheel is substantially cylindrical with a weight of about 50 kg, a diameter of about 332 mm, an outer wall thickness of about 25 mm and a side wall thickness of around 15 mm. It is understood that the outer wall of the wheel is a curved surface and the side walls are circular and substantially perpendicular to the length of the shaft 2. With reference to FIG. 2; typically, the wheel diameter of wheel 3 is about 314 mm with a mass of about 50 kg. For a preferred embodiment of the fourth rotor, the wheel is about 47 mm from the centre line of the NDE bearing assembly 5 and rotates at between about 6000 RPM and about 13000 RPM. The rotor housing 12 supports the bearings and covers the middle part of the shaft 2. However, for ease of understanding of the invention the wheel is not shown in FIG. 1.

Referring to FIGS. 2 and 8a, each rotor housing 12 comprises two symmetrical mating parts, each of which is a semi-cylindrical shell, such that when the two parts mate a substantially cylindrical housing 12 is formed. Each half of the rotor housing 12 is held to the adjacent half of the housing by screws 33. FIG. 8a also shows the screws 11d holding each damper (not shown) to the rotor housing. The rotor housing 12 further comprises brackets 35 that support pipes and wires. A rubber ring 34 at each end 4, 5 of the rotor housing 12 is used for mounting the rotor 1 in the spinner.

Figure 8B:
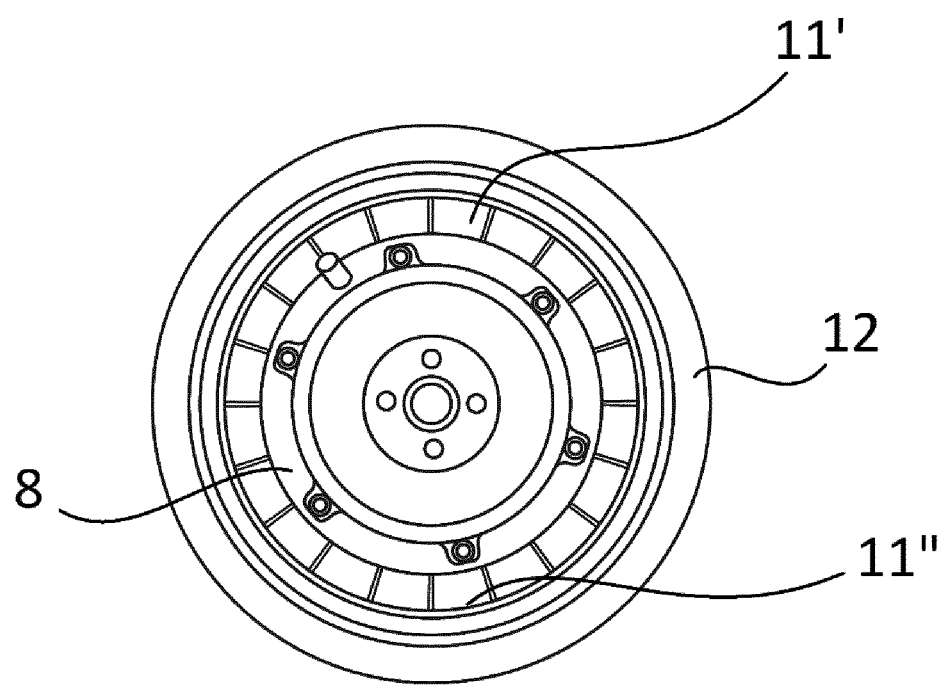
FIG. 8b is a plan view of the NDE of the rotor housing, bearing seat and dampers of the present invention.

Referring to FIG. 8b, in preferred embodiments, the rotor housing 12 has a greater wall thickness of about 5 mm at the base of the housing 12 compared to the upper wall thickness of the rotor housing 12, which effectively lifts the wheel to compensate for the overhanging effect. The internal profile of the rotor housing 12 is asymmetric. Referring to FIG. 8b, the dampers 11' in the top part of the NDE 4 are stretched by about 2.5 mm. The dampers 11" in the bottom part of the NDE 4 are compressed by about 2.5 mm. The offset arrangement of the central axis of the annular mounting ring/bearing seat 8 with respect to the central axis of the annular rotor housing 12 counteracts the effect of gravity on the suspension of the bearings 7, shaft 2 and wheel 13 in the rotor housing 12 so that the centre of gravity of the rotor 1 is in the desired position.

With reference to FIGS. 3 and 6b, the inner surface of each annular bearing seat 8 supports two hybrid ball bearings 7, which are lifetime lubricated super precision hybrid angular contact ball bearings 7 that have been selected to achieve the desired speed and lifetime before failure. The two bearings 7 at each of the DE 3 and NDE 4 are fitted close together with little space between them at each end of the rotor 1.

Figure 9A:
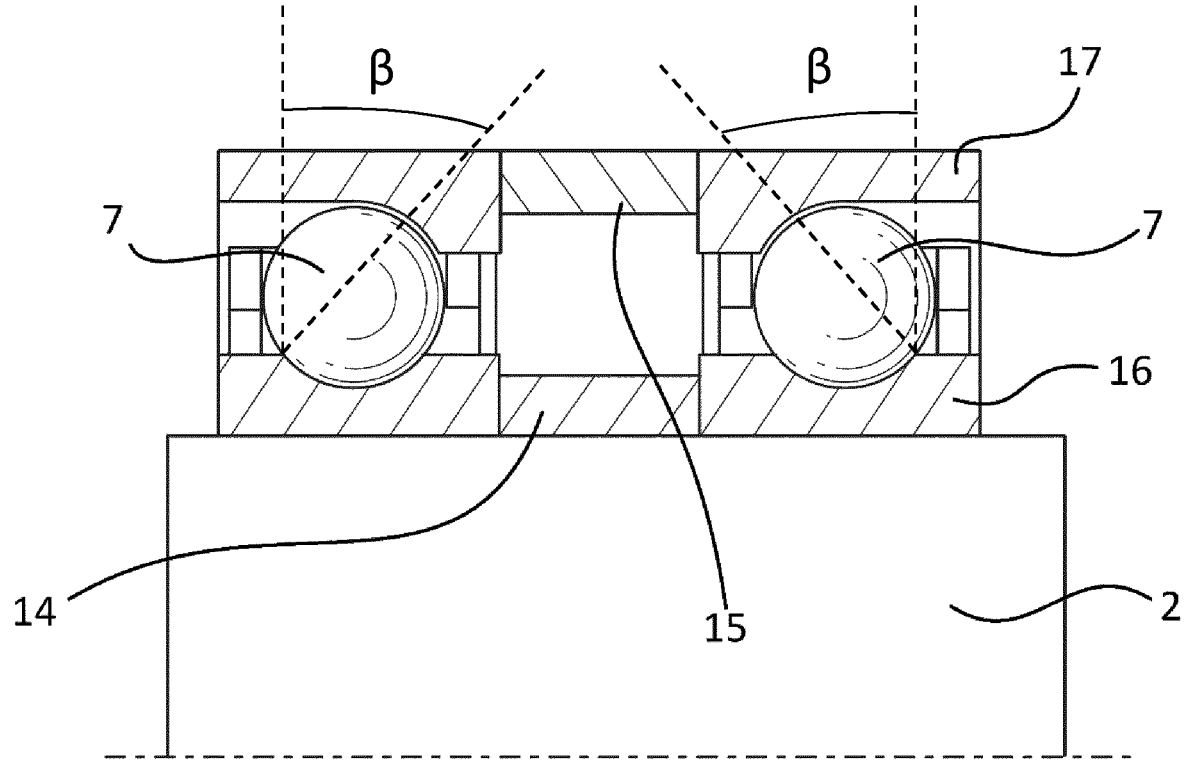
Figure 9B:
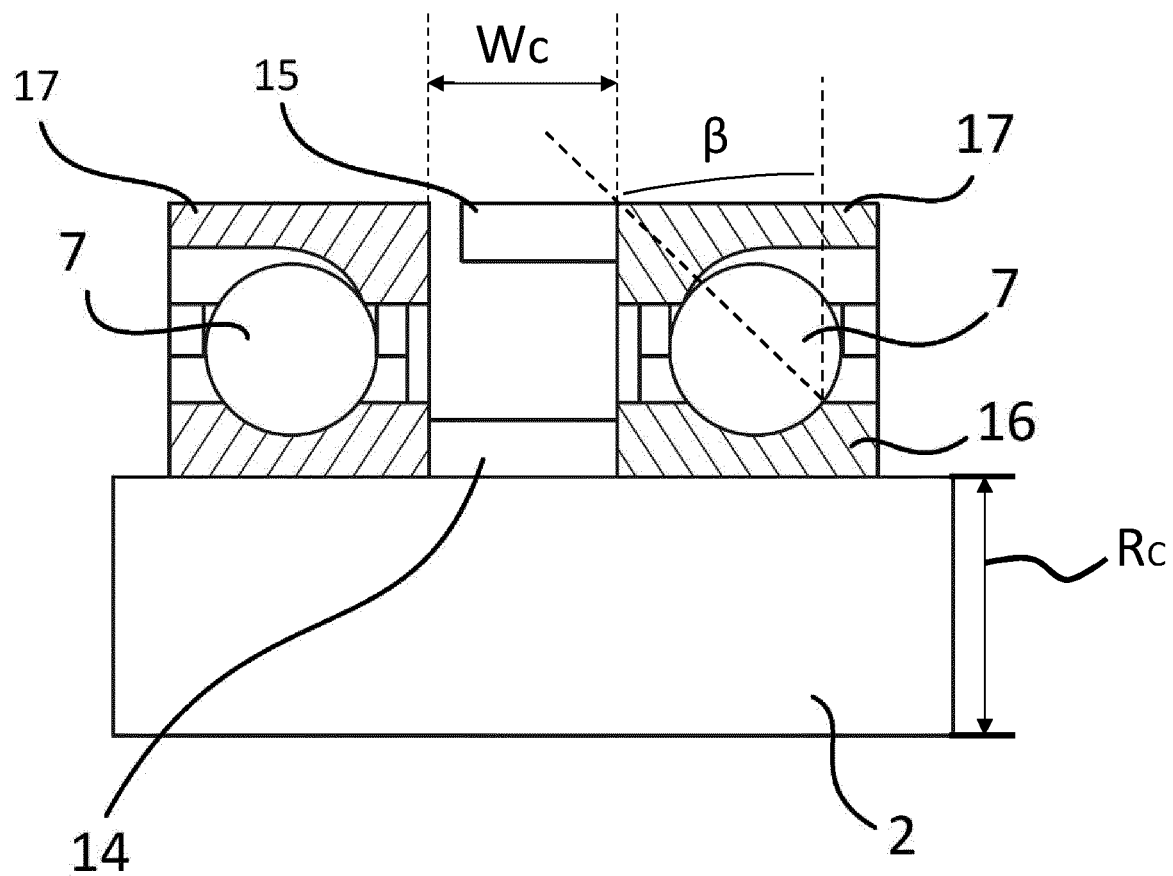
Figure 9C:
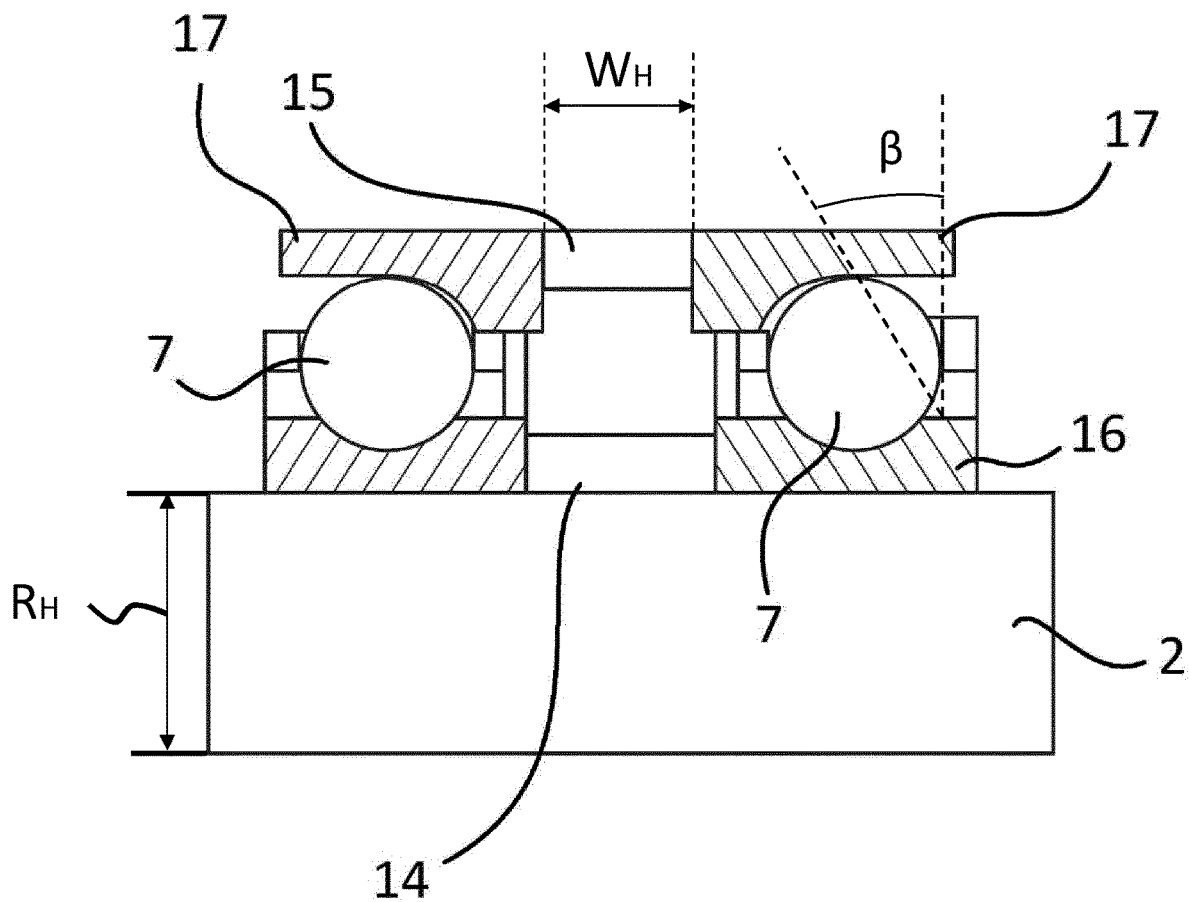

Referring to FIGS. 9a, 9b and 9c, the bearings are ceramic ball bearings 7 between two steel bearing rings 16, 17. The bearings 7 have been selected to withstand loads of up to 1400N. The dynamic load unbalance at the wheel of rotor 4 was determined to be about 560 g·cm and the configuration of the bearing seats and the damper suspensions was optimised to compensate for this unbalance. The angular contact ball bearings 7 have a diameter of about 70 mm, but in alternative embodiments the bearing diameter is any of 60 mm, 65 mm, 70 mm or 75 mm.

In the embodiment of FIGS. 9a, 9b and 9c the ball bearing 7 has a diameter of 70 mm. Each of the pair of ball bearings 7 are axially spaced apart by an inner spacer ring 14 between the rotating inner surfaces of the ball bearings 7 adjacent to the shaft 2 and an outer spacer ring 15 between the rotating inner surfaces of the ball bearings 7 furthest from the shaft 2. The ball bearings 7 are held between a ball bearing inner steel ring 16 mounted on the steel shaft 2 and a ball bearing outer steel ring 17. The angular contact ball bearings 7 each have an angular contact (pressure) angle $\beta$, which is symmetrical about the centre line between the ball bearings 7. The contact angle $\beta$ is the pressure direction during rotation. The contact angle $\beta$ will vary depending on the temperature of the steel shaft 2.

Referring to FIG. 9b, the contact angle $\beta$ will increase if the shaft 2 is colder because the shaft will contract to a smaller diameter. Referring to FIG. 9c, the contact angle $\beta$ decreases if the shaft 2 is hotter because the shaft will expand to a greater diameter. As shown in FIG. 9b when the shaft 2 is cold it has a lesser diameter $R_c$ and the pressure angle $\beta$ is greater. The outer spacer ring 15 has a width $W_c$ and does not make contact with both the ball bearing inner steel ring 16 and the ball bearing outer steel ring 17 and there is greater scope for movement/rattling of the ball bearings 7. However, as shown in FIG. 9c, when the shaft 2 is hot it has a greater diameter $R_H$ and the pressure angle $\beta$ is less. The increased diameter of the shaft also means that the balls 7 of the bearing push the outer bearing seats 17 towards each other until then are in contact with the outer spacer ring 15. Thus, the bearing assembly 5, 6 has been arranged to reduce the bearing preloads due to the expected temperature difference when the rotor is in use, which is about 10° C.

Referring to FIG. 9b and FIG. 9c, it has been found that it is advantageous that the outer spacer ring 15 is shorter than the inner spacer ring 14. Typically, for a bearing diameter of 70 mm for rotor 3 and 4, the width of the outer spacer ring 15 is about 61 μm less than the inner spacer ring 14. For rotor 2 for a bearing diameter of 70 mm, the width of the outer spacer ring 15 is about 16 μm less than the inner spacer ring 14.

Figure 10:
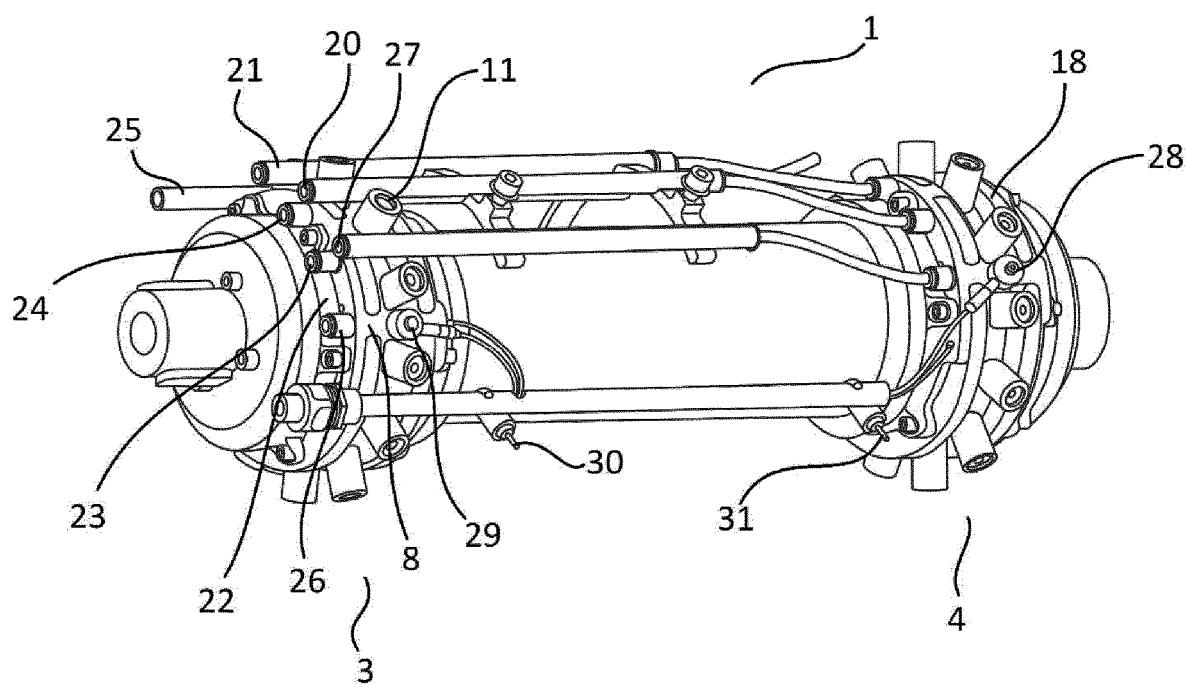
FIG. 10 is an external perspective view of the rotor of the present invention showing the cooling and air purging systems.

As shown in FIGS. 3 and 10, the annular bearing seat 8 is surrounded by end rings 18.

As shown in FIG. 10, the rotor 1 has a cooling system for both the DE bearing assembly 6 and the NDE bearing assembly 5. An NDE cooling fluid inlet 20 and an NDE cooling fluid outlet 21 are connected by channels through which cooling fluid flows to carry heat away from the NDE 4 of the rotor 1. A DE cooling fluid inlet 23 and DE cooling fluid outlet 24 are also connected by channels to carry heat away from the DE 3 of the rotor 1. A fluid inlet 25 for water cooling of the wheel (not shown) is also provided. In the embodiment shown the cooling fluid is water. It has been shown through testing that the bearing temperatures can all be maintained at about 50° C.

Referring to FIG. 10, the rotor 1 further comprises a DE air purge inlet 26 and an NDE air purge inlet 27. The air purge system flushes contaminants from the rotor 1. The rotor 1 further comprises an accelerometer 28 at the NDE 4 and an accelerometer 29 at the DE 3 and a pyrometer 30 at the DE 3 and a pyrometer 31 at the NDE 4.

Figure 11:
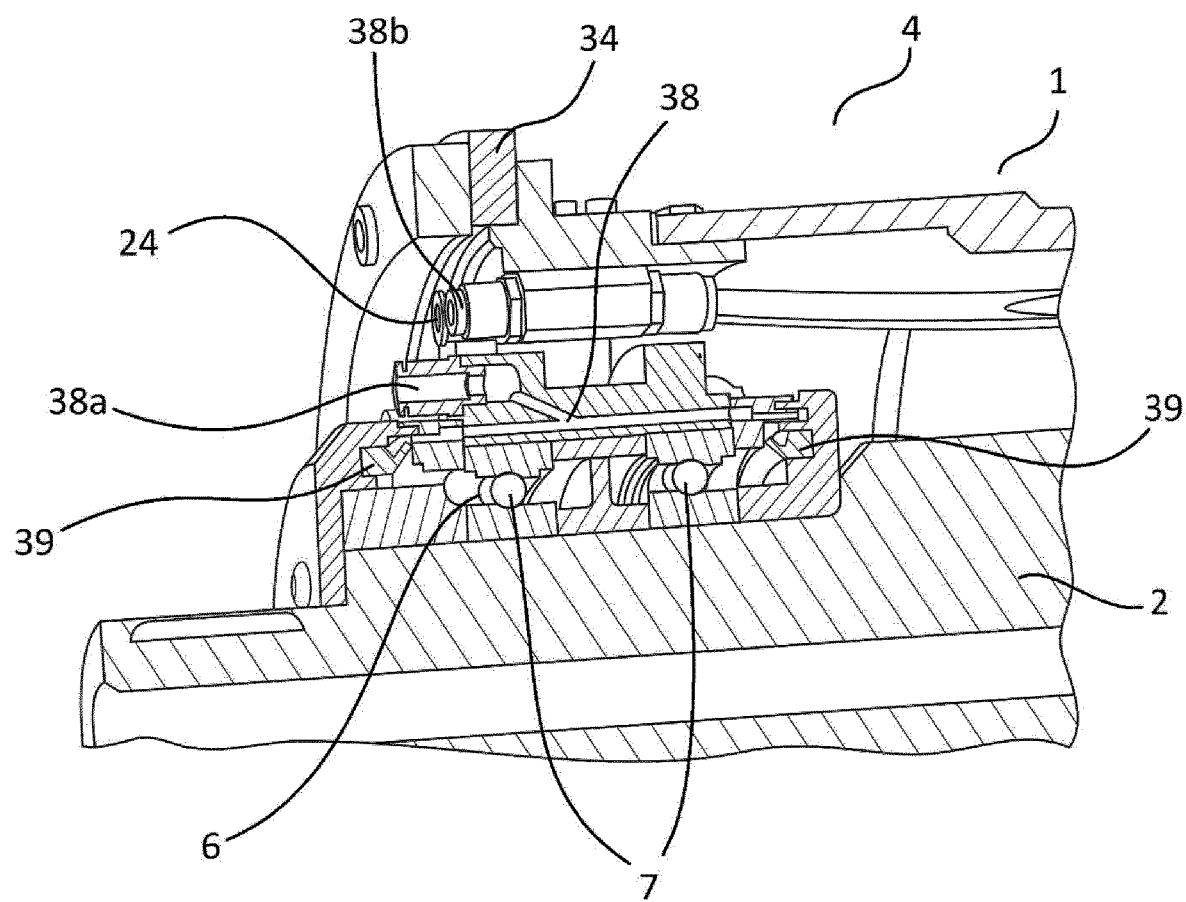
FIG. 11 is a cross-sectional view of the DE bearing seat showing a grease labyrinth.

Referring to FIGS. 10 and 11, the air purging system flushes contaminants from the rotors when the spinner is in use. The rotor also comprises a water-cooling system with a cooling water outlet 24 to carry heated water away from the bearings 7. It has been found that, when washing the spinner during regular servicing, there is potential for water to contaminate the bearings 6. Thus, the present invention further comprises a grease labyrinth 38, as shown in FIG. 11, to prevent water polluting the bearings 7 during washing of the spinner. FIG. 11 shows the DE 4 bearing assembly 6 comprising a rubber ring 34 for mounting the rotor 1 in a spinner. For the DE 3 shown, there is a DE labyrinth grease inlet 38a and an NDE labyrinth grease inlet 38b. The NDE labyrinth grease inlet 38b carries grease to the NDE 4, which has a similar grease labyrinth. When the rotor is still because the spinner is being serviced, the labyrinth 38 is sealed with grease to prevent water polluting the bearings 7 during washing. Sealing rings 39 prevent labyrinth grease from flowing into the bearings 7, which are lifetime lubricated with their own grease.

Figure 12:
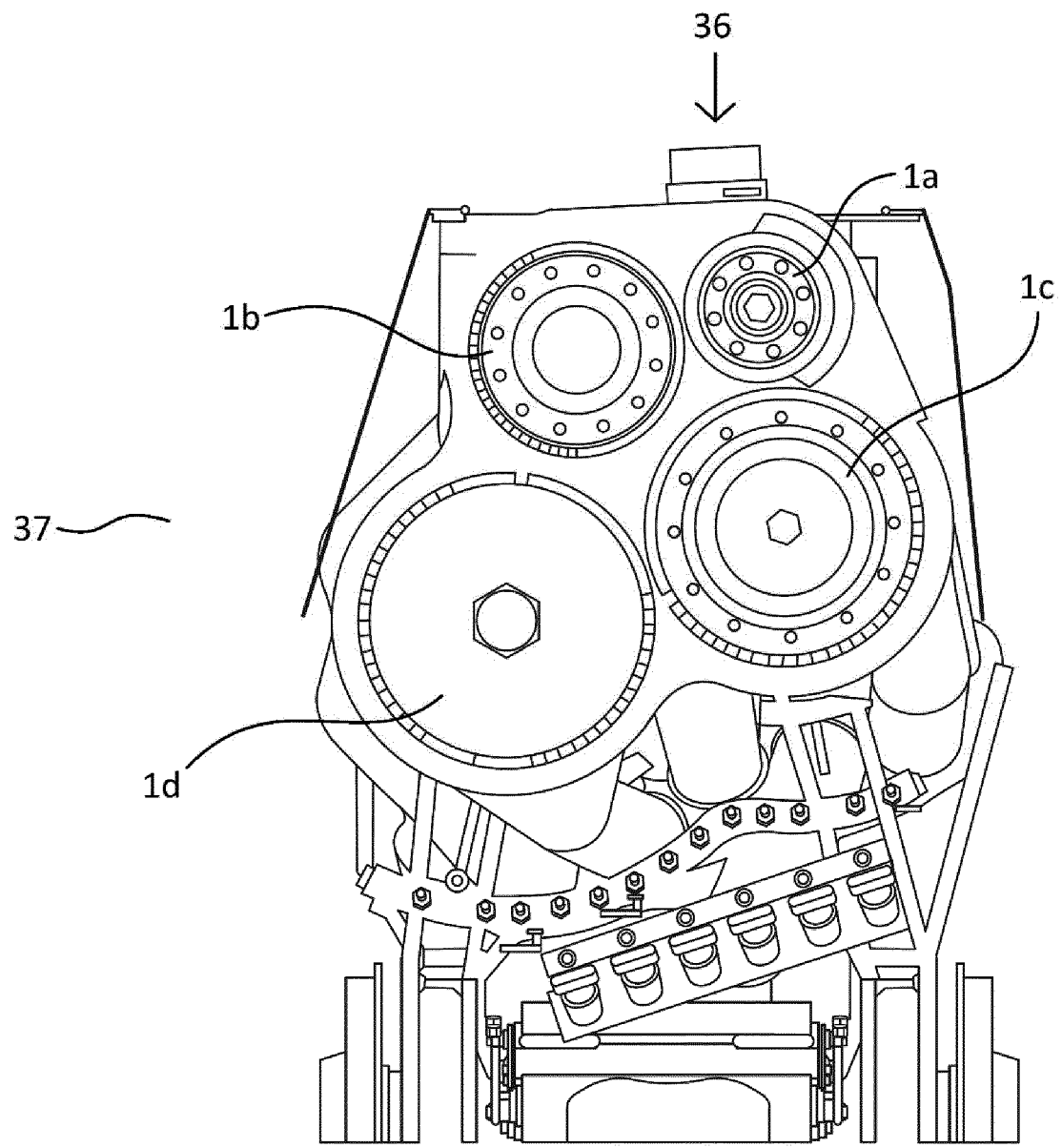
FIG. 12 is a front view of the right position spinner of the present invention showing all four rotors with mounted wheels.

Referring to FIG. 12, in use, a fiberising apparatus comprising four rotors 1a, 1b, 1c, 1d is used to manufacture man-made vitreous fibres (MMVF).

Each rotor 1a, 1b, 1c, 1d is mounted for rotation about a different substantially horizontal axis and each rotor 1a, 1b, 1c, 1d has a drive means, which may be a single drive means to power all four rotors 1. In a preferred embodiment, a second rotor comprises a suspension ring at the non-drive end bearing assembly having fourteen neoprene rubber dampers and the third and fourth rotor at the non-drive end have a bearing assembly with twenty neoprene rubber dampers. The second rotor comprises twelve neoprene rubber dampers at the drive end bearing assembly and the third and fourth rotors have eighteen neoprene rubber dampers at the drive end bearing assembly.

Each right position rotor 1a, 1b, 1c, 1d has a high-speed motor connected at one end by a flexible coupling and a wheel is placed at the opposing end of the rotor 1a, 1b, 1c, 1d. In the embodiment shown in FIG. 12, rotors 1 and 3 rotate in an anticlockwise direction and rotors 2 and 4 rotate in a clockwise direction. The wheel of the first rotor 1a has a diameter of about 184 mm; the wheel of the second rotor 1b has a diameter of about 234 mm; the wheel of the third rotor 1c has a diameter of about 314 mm and the wheel of the fourth rotor 1d has a diameter of about 332 mm. The space between the outer surface of each mounted wheel varies, with the greatest distance of about 228 mm between the wheels of the first and fourth rotor 1a, 1d and the least distance of about 17 mm between the first and second rotors 1a, 1b.

Referring to FIG. 12, with the rotors 1a, 1b, 1c, 1d rotating a molten mineral melt of stone or rock or a slag or glass melt is poured through an inlet 36 onto the periphery of the wheel of the first rotor 1a to spin the melt and throw off MMVF. The melt is then thrown successively to the wheels of the remaining three rotors 1b, 1c, 1d and fibres are formed and collected each time. Simultaneously, as the melt passes to the wheel of each successive rotor 1a, 1b, 1c, 1d, a high-pressure air flow through the spinner and along the wheel removes fibres from the wheels for collection.

For a typical four rotor fiberising apparatus according to the present invention, wheel 1 produces about 5% of the hourly stone wool production; wheel 2 produces about 25%, wheel 3 produces about 40% and wheel 4 produces about 30%. Manufacture using the rotors of the present invention can continue for around 4000 hours before the ball bearings 7 require replacement, which is a significant increase over known devices. An endurance test comparing a prior art spinner running at max speed (9300 RPM) with a spinner according to the present invention running at 13000 RPM, both operating with an unbalance of 560 g·cm, showed an improvement from 603 hours to more than 4000 hours. Further tests have found a mean time between failure of approximately 15000 hours for a spinner according to the present invention.

Figure 13:
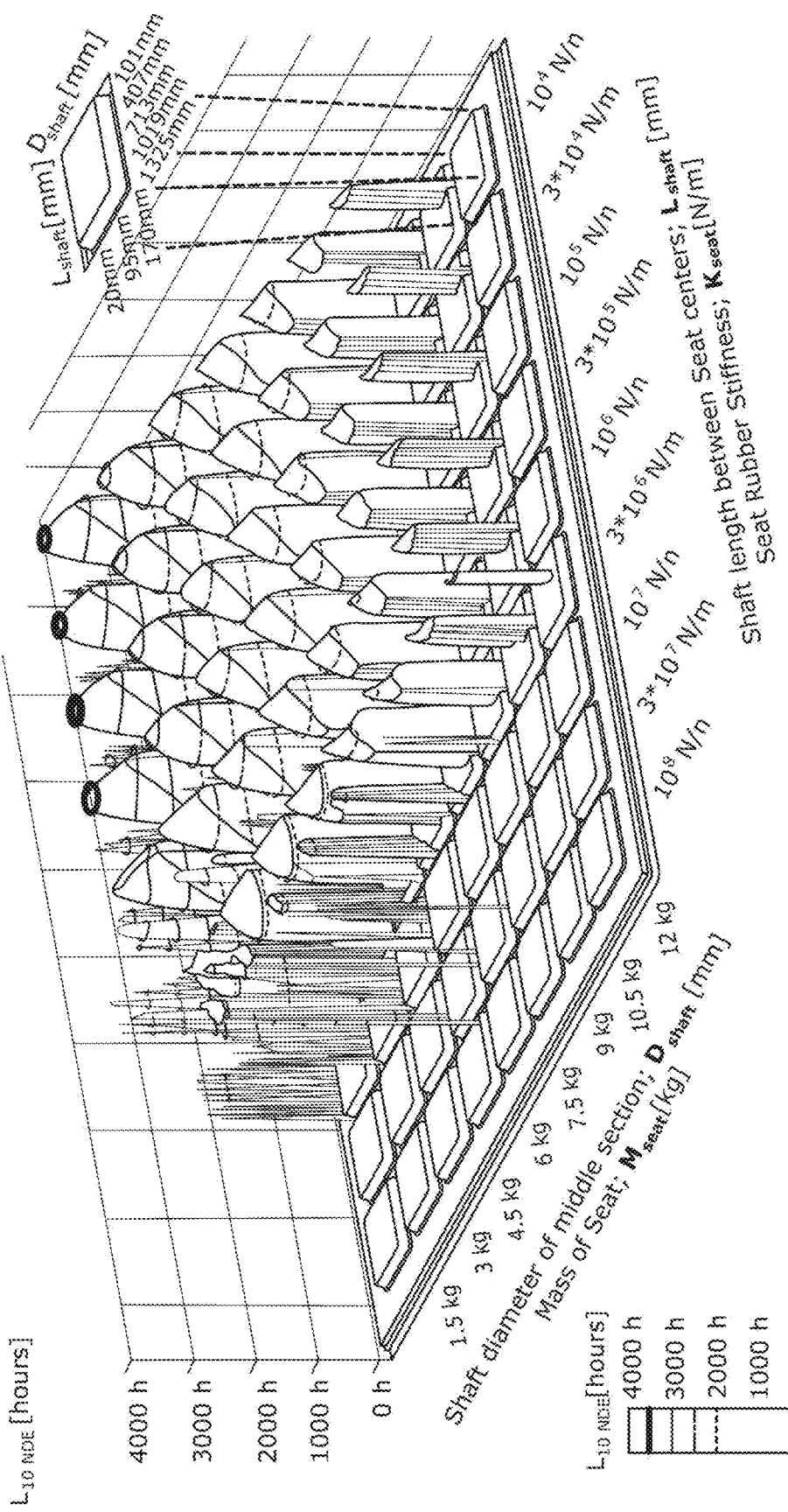
FIG. 13 is a rear view of a 5D surface and contour plot of rotor 4 simulating the lifetime for the NDE bearing seat for varying shaft diameter, mass of seat, shaft length and seat rubber stiffness (damper ring stiffness) at a maximum rotor speed of 13000 RPM.

Referring to FIG. 13, to evaluate the optimum parameters for the improved rotor of the present invention, simulations were conducted for a range of shaft lengths ($L_{shaft}$), shaft diameter ($D_{shaft}$), damper ring stiffness ($K_{seat}$), bearing seat mass ($M_{seat}$) and bearing diameter. The effect of these values on the bearing lifetime ($L_{10}$) and rotor shaft displacement ($\Delta x$) were shown in 5D plots.

FIG. 13 is a rear view of a 5D contour plot for rotor 4 at a maximum rotor speed of 13000 RPM for an NDE seat having a bearing diameter of 70 mm. The height of each peak ($L_{10}$) represents the bearing lifetime in hours or the Basic Life Rating. The bearing lifetime statistic used is a measure of the amount of time in revolutions when 90% of the ball bearings can be expected to survive.

As shown in FIG. 13, the optimum configuration of the present invention allows for a maximised bearing lifetime of 3617 hours. The simulation considers a range of shaft diameter ($D_{shaft}$) and bearing seat mass ($M_{seat}$) plotted together with the shaft length ($L_{shaft}$) between bearing seat centres and rubber stiffness ($K_{seat}$) at the bearing seat. Each cube shown in the 5D plot of FIG. 13 symbolises a 3D plot of the function of the lifetime ($L_{10}$) with shaft length ($L_{shaft}$) and shaft diameters ($D_{shaft}$) as arguments. In each 3D subplot are rubber stiffness ($K_{seat}$) and bearing seat mass ($M_{seat}$) constants as dictated by the position of the 3D subplot.

Figure 14:
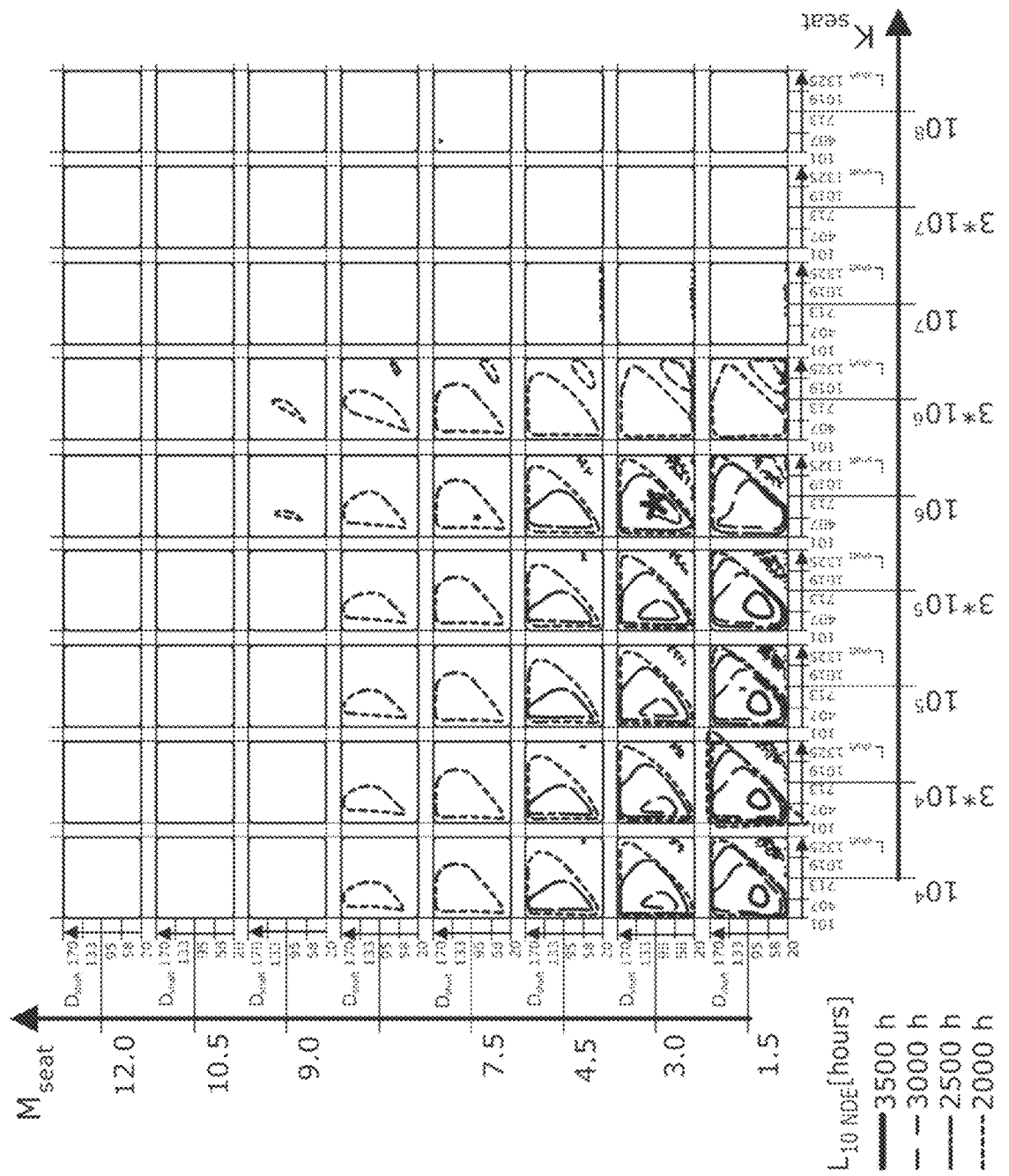
FIG. 14 shows a view from above of the 5D surface and contour plot of FIG. 13, showing mass of seat ($M_{seat}$ kg), shaft diameter of middle section ($D_{shaft}$ mm), shaft length between seat centres ($L_{shaft}$ mm) and seat rubber stiffness ($K_{seat}$ N/m)

FIG. 14 shows a view from above of the 5D reface and contour plot of rotor 4 shown in FIG. 13. Each square of the plot shows a shaft length range of 101 to 1325 mm in increments of 101 mm, 407 mm, 713 mm, 1019 mm and 1325 mm and a shaft diameter range of 20 to 170 mm in increments of 20 mm, 58 mm, 95 mm, 133 mm and 170 mm. The range of rubber stiffness ($K_{seat}$) is from $10^4$ N/m to $10^8$ N/m. and bearing seat mass ($M_{seat}$) from 1.5 to 12.0 kg.

Referring to FIG. 13 and FIG. 14, the rubber stiffness ($K_{seat}$) at the bearing seat is optimised at about $10^6$ N/m or lower. It is also preferable that the bearing seat mass ($M_{seat}$) is as low as possible, with improvement in the bearing lifetime for the reduced 3 kg mass of the bearing seat of the present invention. It was also found that if the seat mass ($M_{seat}$) is reduced too far; for example, to about 1.5 kg it would be necessary to reduce the rubber stiffness ($K_{seat}$) at the bearing seat to achieve any gain in bearing lifetime. It is also shown that for the shaft length ($L_{shaft}$) of 590 mm and shaft diameter ($D_{shaft}$) of 100 mm for the present invention, an improvement in bearing lifetime is achieved. Further embodiments of the present invention, with a bearing diameter of 60 mm have been investigated and it was found that the present invention can achieve a maximum bearing lifetime of 6183 hours.

Figure 15:
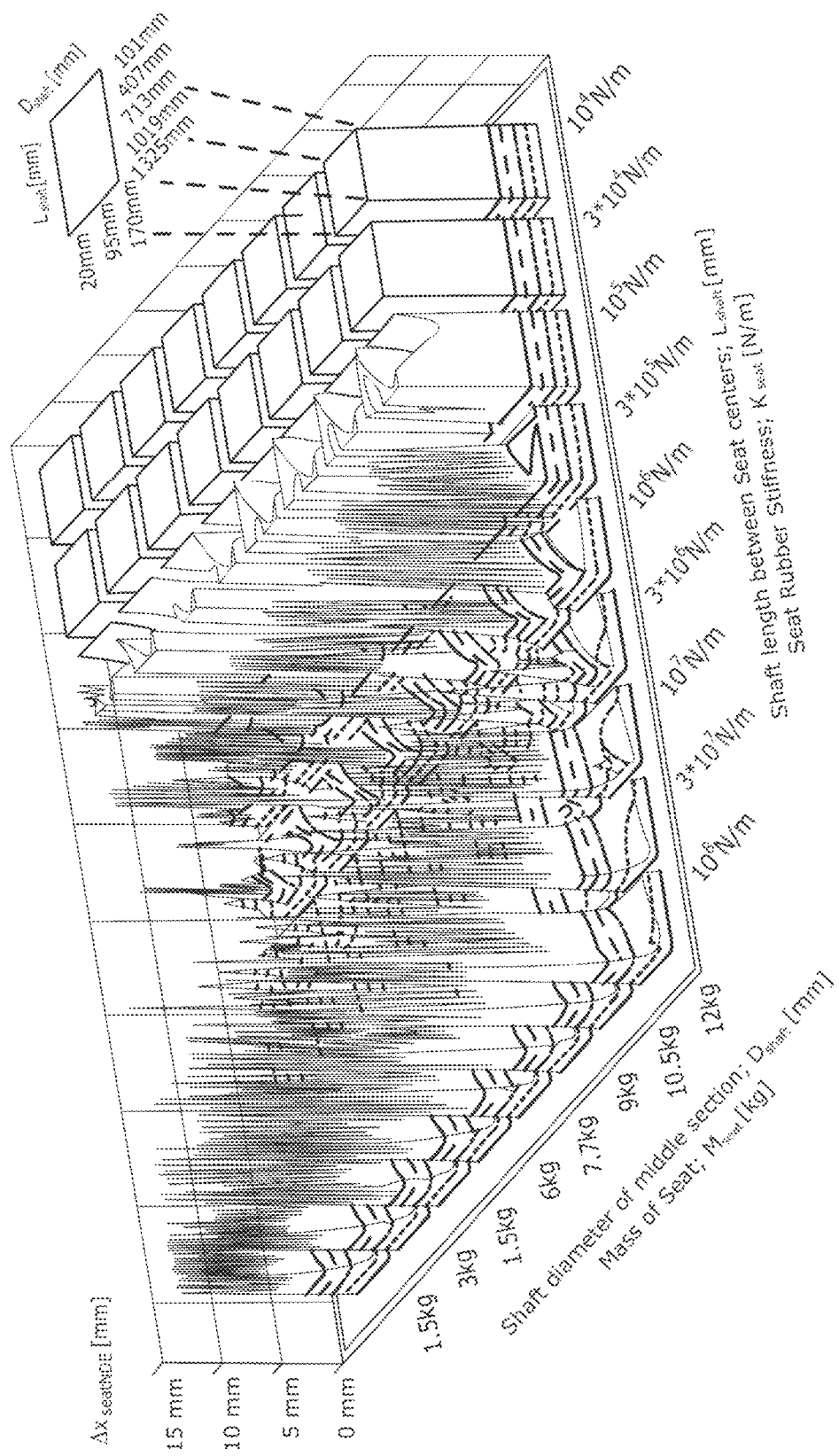
FIG. 15 shows a 5D and contour plot of rotor 4 simulating the displacement of the NDE seat ($\Delta x_{seatNDE}$) at a maximum rotor speed of 13000 RPM.

Referring to FIG. 15, a 5D surface and contour plot for rotor 4 is shown plotting displacement of the NDE seat ($\Delta x_{seatNDE}$) at maximum rotor speed of 13000 RPM for an NDE seat having a bearing diameter of 70 mm. As shown, for the maximum allowable displacement ($\Delta x_{seatNDEmax}$) of 15 mm the seat rubber stiffness is $10^5$ N/m. Thus, it was concluded that, to avoid exceeding the maximum allowable bearing seat displacement, the seat rubber stiffness (damper ring stiffness) should be greater than $10^5$ N/m.

Within this specification, the term "about" means plus or minus 20%; more preferably, plus or minus 10%; even more preferably, plus or minus 5%; most preferably, plus or minus 2%.

Within this specification, the term "substantially" means a deviation of plus or minus 20%; more preferably, plus or minus 10%; even more preferably, plus or minus 5%; most preferably, plus or minus 2%.

The above described embodiment has been given by way of example only, and the skilled reader will naturally appreciate that many variations could be made thereto without departing from the scope of the claims.

The invention claimed is:

1. A rotor for a fiberising apparatus comprising:
a rotor housing;
a first bearing assembly and a second bearing assembly, wherein each bearing assembly comprises at least two ball bearings, each seated in a respective bearing seat;
a substantially horizontal shaft rotatably mounted between the first bearing assembly and the second bearing assembly;
a plurality of resilient dampers arranged in an annular ring, wherein each resilient damper is connected and held at a first end to the bearing seat and connected and held at a second end to an inner wall of the rotor housing; and
wherein each resilient damper comprises a threaded screw for releasable connection to the bearing seat and each resilient damper comprises a threaded aperture for releasable connection with a screw through the rotor housing.

2. The rotor according to claim 1, wherein each resilient damper is a frustum, or wherein each resilient damper is frustoconical.

3. The rotor according to claim 1, wherein the plurality of resilient dampers comprise frustoconical resilient dampers.

4. The rotor according to claim 3, wherein each resilient damper has a greater diameter at the damper face adjacent to the inner wall of the rotor housing and a lesser diameter at the damper face adjacent to the bearing seat.

5. The rotor according to claim 1, wherein each resilient damper is any of a rubber damper, a silicone damper, a neoprene rubber damper.

6. The rotor according to claim 1, wherein the plurality of resilient dampers is adapted for a working rotation speed of the rotor of between about 4000 RPM and 13000 RPM.

7. The rotor according to claim 1, wherein a base wall thickness of the rotor housing is greater than an upper wall thickness of the rotor housing.

8. The rotor according to claim 1, wherein the rotor housing has a base wall thickness about 5 mm greater than an upper wall thickness of the rotor housing.

9. The rotor according to claim 1, wherein the internal profile of the rotor housing is asymmetric.

10. The rotor according to claim 1, wherein each bearing seat is substantially cylindrical, the rotor housing is substantially cylindrical and the central axis of the bearing seat is offset from the central axis of the rotor housing.

11. The rotor according to claim 1, wherein each resilient damper has a Shore A hardness of about 55.

12. The rotor according to claim 1 wherein a stiffness of the plurality of resilient dampers arranged in an annular ring is between about $5 \cdot 10^5$ to about $10^6$ N/m.

13. The rotor according to claim 1, wherein the plurality of resilient dampers comprises between about 10 and about 24 frustoconical resilient dampers arranged annularly.

14. The rotor according to claim 1, wherein the plurality of resilient dampers are equidistant from each other around a substantially annular bearing assembly.

15. The rotor according to claim 1, wherein at least one of the at least two ball bearings of the first and second bearing assembly is a hybrid angular ball bearing.

16. The rotor according to claim 1, wherein the inner diameter of at least one of the at least two ball bearings of the first and second bearing assembly is between about 60 mm and about 75 mm.

17. The rotor according to claim 1, wherein at least one of the at least two ball bearings of the first and second bearing assembly is made of a ceramic material.

18. The rotor according to claim 1, wherein at least one of the at least two ball bearings of the first and second bearing assembly is a hybrid angular ball bearing and a distance between the at least two ball bearings is about 20 mm.

19. The rotor according to claim 1, wherein the clearance between each bearing seat and an inner surface of the inner wall of the rotor housing is about 14 mm.

20. The rotor according to claim 1, wherein the at least two ball bearings of the first and second bearing assembly are hybrid angular ball bearings and wherein the at least two hybrid angular ball bearings are spaced apart by an inner axial spacer ring and an outer axial spacer ring; wherein a width of the outer axial spacer ring is less than a width of the inner axial spacer ring.

21. The rotor according to claim 1, wherein the at least two ball bearings of the first and second bearing assembly are hybrid angular ball bearings, wherein the at least two hybrid angular ball bearings are spaced apart by an inner axial spacer ring and an outer axial spacer ring and wherein the width of the outer axial spacer ring is between about 16 µm and 61 µm less than the width of the inner axial spacer ring.

22. The rotor according to claim 1, wherein a relationship between the substantially horizontal shaft diameter ($D_{shaft}$)

and the substantially horizontal shaft length ($L_{shaft}$) is defined as: $D_{shaft}(L_{shaft}) \geq 0.12 * L_{shaft} - 32$ mm for a range of substantially horizontal shaft lengths between about 101 mm and 1325 mm and for a range of substantially horizontal shaft diameters greater than or equal to 20 mm and for a stiffness of the plurality of resilient dampers arranged in an annular ring of less than or equal to $3*10^6$ N/m.

23. The rotor according to claim 1, wherein the outer cross-sectional diameter of the substantially horizontal shaft is about 100 mm; the substantially horizontal shaft has a bearing seat diameter of about 70 mm; the total length of the substantially horizontal shaft is about 955 mm; and wherein a length of the substantially horizontal shaft between a centre-point of the first bearing assembly and a centre-point of the second bearing assembly is about 590 mm.

24. The rotor according to claim 1, wherein the weight of each bearing seat is less than or equal to 3 kg.

25. A fiberising apparatus comprising a set of at least three rotors according to claim 1, wherein each rotor is mounted for rotation about a different substantially horizontal axis and arranged such that, when the rotors are rotating, melt poured on to the periphery of the first rotor in the set is thrown successively onto the periphery of each of the subsequent rotors and fibres are thrown off from the rotors.

26. The rotor according to claim 1, wherein each of the resilient dampers comprises a central axis which extends radially of the shaft.

27. The rotor according to claim 1, wherein each resilient damper is releasably fixed at a first end to the bearing seat and releasably fixed at a second end to the inner wall of the rotor housing.

28. A rotor for a fiberising apparatus comprising:
a rotor housing;
a first bearing assembly and a second bearing assembly, wherein each bearing assembly comprises at least two ball bearings, each seated in a respective bearing seat;
a substantially horizontal shaft rotatably mounted between the first bearing assembly and the second bearing assembly; and
a plurality of resilient dampers arranged in an annular ring, wherein each resilient damper is connected at a first end to the bearing seat and connected at a second end to an inner wall of the rotor housing; and
wherein each resilient damper comprises a threaded screw for releasable connection to the bearing seat.

29. A rotor for a fiberising apparatus comprising:
a rotor housing;
a first bearing assembly and a second bearing assembly, wherein each bearing assembly comprises at least two ball bearings, each seated in a respective bearing seat;
a substantially horizontal shaft rotatably mounted between the first bearing assembly and the second bearing assembly; and
a plurality of resilient dampers arranged in an annular ring, wherein each resilient damper is connected at a first end to the bearing seat and connected at a second end to an inner wall of the rotor housing; and
wherein each resilient damper comprises a threaded aperture for releasable connection with a screw through the rotor housing.

30. A rotor for a fiberising apparatus comprising:
a rotor housing;
a first bearing assembly and a second bearing assembly, wherein each bearing assembly comprises at least two ball bearings, each seated in a respective bearing seat;
a substantially horizontal shaft rotatably mounted between the first bearing assembly and the second bearing assembly;
a plurality of resilient dampers arranged in an annular ring, wherein each resilient damper is releasably connected and engaged at a first end to the bearing seat and releasably connected and engaged at a second end to an inner wall of the rotor housing; and
wherein each resilient damper comprises a threaded screw for releasable connection to the bearing seat and each resilient damper comprises a threaded aperture for releasable connection with a screw through the rotor housing.

* * * * *